(12) United States Patent
Ueno et al.

(10) Patent No.: US 10,886,773 B2
(45) Date of Patent: Jan. 5, 2021

(54) INFORMATION PROCESSING SYSTEM, BATTERY MODULE, CONTROL METHOD, AND PROGRAM

(71) Applicants: Envision AESC Energy Devices Ltd., Kanagawa (JP); NEC Corporation, Tokyo (JP)

(72) Inventors: Hiroaki Ueno, Kanagawa (JP); Keiji Katayama, Tokyo (JP)

(73) Assignees: Envision AESC Energy Devices, Ltd., Kanagawa (JP); NEC Corporation, Tokyo (JP)

( * ) Notice: Subject to any disclaimer, the term of this patent is extended or adjusted under 35 U.S.C. 154(b) by 109 days.

(21) Appl. No.: 16/311,864
(22) PCT Filed: Apr. 13, 2017
(86) PCT No.: PCT/JP2017/015115
§ 371 (c)(1),
(2) Date: Dec. 20, 2018
(87) PCT Pub. No.: WO2018/003234
PCT Pub. Date: Jan. 4, 2018

(65) Prior Publication Data
US 2019/0207413 A1 Jul. 4, 2019

(30) Foreign Application Priority Data
Jun. 30, 2016 (JP) .................. 2016-129617

(51) Int. Cl.
*H02J 7/00* (2006.01)
*H02J 7/34* (2006.01)
(Continued)

(52) U.S. Cl.
CPC ............. *H02J 7/34* (2013.01); *H01M 10/425* (2013.01); *H01M 10/633* (2015.04);
(Continued)

(58) Field of Classification Search
None
See application file for complete search history.

(56) References Cited

U.S. PATENT DOCUMENTS 8,232,886 B2 * 7/2012 Kawai ................. H04L 61/2092
340/636.1
8,933,671 B2 * 1/2015 Lee ........................ B60L 58/12
320/135
(Continued)

FOREIGN PATENT DOCUMENTS

EP 2081038 A1 7/2009
EP 2725686 A1 4/2014
(Continued)

OTHER PUBLICATIONS

Extended European Search Report issued in European Patent Application No. 17819602.8, dated Oct. 30, 2019, 10 pages.
(Continued)

*Primary Examiner* — Leigh M Garbowski
(74) *Attorney, Agent, or Firm* — Wilmer Cutler Pickering Hale and Dorr LLP

(57) ABSTRACT

A first communication network (3020) communicably connects each battery module (2000). A second communication network (3040) is configured in a linear topology. Each battery module (2000) can communicate with another battery module (2000) adjacent on the second communication network (3040). An identifier information transmission unit (2020) transmits identifier information to all of the other battery modules (2000) through the first communication network (3020). An identifier information reception unit (2040) receives the identifier information through the first communication network (3020). A first notification execution unit (2060) performs first notification through the second communication network (3040). A first notification detection unit (2080) detects the first notification through the second communication network (3040). A determination unit (2100) determines whether or not a first identifier of the
(Continued)

battery module (2000) is a duplicate of the first identifier of the other battery module (2000).

14 Claims, 18 Drawing Sheets

(51) Int. Cl.
    *H01M 10/633*     (2014.01)
    *H01M 10/42*     (2006.01)

(52) U.S. Cl.
    CPC ............ *H02J 7/007* (2013.01); *H02J 7/0013* (2013.01); *H02J 7/00036* (2020.01); *H01M 2010/4271* (2013.01); *H01M 2010/4278* (2013.01); *H02J 7/00041* (2020.01)

(56) References Cited

U.S. PATENT DOCUMENTS

| | | | |
|---|---|---|---|
| 8,963,507 B2* | 2/2015 | Kim | ............... H02J 7/0013 320/162 |
| 9,436,261 B2* | 9/2016 | Yun | ............... G06F 1/3212 |
| 2010/0182154 A1 | 7/2010 | Kawai et al. | |
| 2014/0091769 A1 | 4/2014 | Kim et al. | |
| 2014/0091770 A1 | 4/2014 | Lee et al. | |
| 2014/0365792 A1 | 12/2014 | Yun | |

FOREIGN PATENT DOCUMENTS

| | | | |
|---|---|---|---|
| EP | 2840643 A1 | 2/2015 | |
| JP | 2009-089521 A | 4/2009 | |
| JP | 2012-222527 A | 11/2012 | |
| JP | 2012-244794 A | 12/2012 | |
| JP | 2013-109628 A | 6/2013 | |
| JP | 2014-239639 A | 12/2014 | |
| JP | 2015-507451 A | 3/2015 | |
| KR | 10-2013-0058373 A | 6/2013 | |

OTHER PUBLICATIONS

International Search Report corresponding to PCT/JP2017/015115, 2 pages, dated Jul. 11, 2017.

* cited by examiner

Fig. 4

| 0~3 byte | 4byte | 5byte | 6byte | 7byte |
|---|---|---|---|---|
| manufacturing number | first identifier | status | – | – |

INFORMATION PROCESSING SYSTEM, BATTERY MODULE, CONTROL METHOD, AND PROGRAM

CROSS-REFERENCE TO RELATED APPLICATIONS

This application is a national stage application of International Application No. PCT/JP2017/015115 entitled "INFORMATION PROCESSING SYSTEM, BATTERY MODULE, CONTROL METHOD, AND PROGRAM," filed on Apr. 13, 2017, which claims the benefit of the priority of Japanese Patent Application No. 2016-129617 filed on Jun. 30, 2016, the disclosures of each of which are hereby incorporated by reference in their entirety.

TECHNICAL FIELD

The present invention relates to an information processing system, a battery module, a control method, and a program.

BACKGROUND ART

Storage batteries have been used in various situations. For example, a storage battery is used for storing electric power that is acquired by electric power generation using renewable energy such as sunlight.

The storage battery includes one or more battery modules. The battery module includes one or more secondary batteries such as lithium ion batteries. Furthermore, the battery module contains a controller for exchanging control information or the like with other battery modules. The controller is called a battery management unit (BMU). Communication between battery modules is performed through a communication network such as a controller area network (CAN).

In a case where the control information or the like is exchanged through the communication network, an identifier is needed in order to identify each battery module. One of methods for setting the identifier in the battery module is a method in which a manager or the like of the battery module manually sets the identifier. For example, an identifier setting circuit such as a DIP switch is disposed in the battery module. Then, the manager changes the DIP switch or the like of the battery module to a desired setting in order to set a desired identifier.

In Patent Documents 1 to 3, a technique for automatically setting the identifier of the battery module is disclosed. In the invention of Patent Document 1, battery modules are connected in series. In this invention, each battery module is assigned an identifier corresponding to its position. For example, an identifier of "1" is assigned to the battery module at the head. In Patent Documents 2 and 3, a master battery module decides the identifiers of other battery modules, and those identifiers are assigned to the other battery modules.

RELATED DOCUMENT

Patent Document

[Patent Document 1] Japanese Patent Application Publication No. 2012-244794
[Patent Document 2] Japanese Patent Application Publication No. 2013-109628
[Patent Document 3] PCT Japanese Translation Patent Publication No. 2015-507451

SUMMARY OF THE INVENTION

Technical Problem

In a case where there is duplication of identifiers between different battery modules, it is necessary to detect this duplication. It is because the existence of multiple battery modules having the same identifier in one network causes collision of communications, and therefore make correct communications impossible.

Typically, a unique identifier is set in the battery module. However, in reality, an identifier may be duplicate between battery modules. For example, as a result of an erroneous identifier setting operation performed by the manager of the battery module, the same identifier may be set in different battery modules. In addition, for example, in a case where a battery module that is included in a certain network is migrated to another network, the identifier set in the battery module may be a duplicate of the identifier of another battery module included in the migration destination network.

In the above related documents, duplication of the identifier set in the battery module is not mentioned.

The present invention is conceived in view of the above problem. An object of the present invention is to provide a technique for efficiently detecting duplication of an identifier between battery modules.

Solution to Problem

An information processing system of the present invention includes a plurality of battery modules. Each battery module is communicable with all of other battery modules through a first communication network. Each battery module is communicable with another battery module through a second communication network constituting a linear topology. The battery module includes (1) an identifier information transmission unit that transmits identifier information to all of other battery modules through the first communication network. The identifier information indicates a first identifier on the first communication network that is set in the battery module, or indicating a fact that the first identifier is not set in the battery module. The battery module includes (2) an identifier information reception unit that receives the identifier information transmitted by the other battery module, (3) a first notification execution unit that performs first notification through the second communication network for the other battery module adjacent in a first direction on the second communication network, (4) a first notification detection unit that detects the first notification performed by the other battery module adjacent in a second direction on the second communication network, and (5) a determination unit that determines whether or not the first identifier of the battery module is a duplicate of the first identifier of each of other battery modules using the identifier information received from each of the other battery modules in response to a fact that the identifier information is transmitted by the identifier information transmission units of all of the plurality of battery modules. The identifier information transmission unit of a first battery module transmits the identifier information in response to a predetermined event other than detection of the first notification by the first notification detection unit of the first battery module. The identifier information transmission unit of each battery module other than the first battery module transmits the identifier information in response to a fact that the first notification is detected by the first notification detection unit.

A battery module of the present invention is the battery module included in the information processing system of the present invention.

A control method of the present invention is a control method that is executed by an information processing system including a plurality of battery modules. Each battery module is communicable with all of other battery modules through a first communication network. Each battery module is communicable with another battery module through a second communication network constituting a linear topology. The control method includes (1) an identifier information transmission step in which the battery module transmits identifier information to all of the other battery modules through the first communication network by the battery module. The identifier information indicates a first identifier on the first communication network that is set in the battery module, or indicating a fact that the first identifier is not set in the battery module. Furthermore, the control method includes (2) an identifier information reception step in which the battery module receives the identifier information transmitted by the other battery module, (3) a first notification execution step in which the battery module performs first notification through the second communication network for the other battery module adjacent in a first direction on the second communication network, (4) a first notification detection step in which the battery module detects the first notification performed by the other battery module adjacent in a second direction on the second communication network, and (5) a determination step in which the battery module determines whether or not the first identifier of the battery module is a duplicate of the first identifier of each of other battery modules using the identifier information received from each of the other battery modules in response to a fact that the identifier information is transmitted by the identifier information transmission step of all of the plurality of battery modules. In the identifier information transmission step of a first battery module, the identifier information is transmitted in response to a predetermined event other than detection of the first notification in the first notification detection step of the first battery module. In the identifier information transmission step of each battery module other than the first battery module, the identifier information is transmitted in response to a fact that the first notification is detected in the first notification detection step.

A program of the present invention causes a computer to execute each step included in the control method of the present invention.

Advantageous Effects of Invention

According to the present invention, a technique for efficiently detecting duplication of an identifier between battery modules is provided.

BRIEF DESCRIPTION OF THE DRAWINGS

The above object and other objects, features, and advantages will become more apparent from example embodiments set forth below and the following drawings appended thereto.

FIG. 4 is a diagram illustrating a data structure of identifier information in a CAN communication network.

DESCRIPTION OF EMBODIMENTS

Hereinafter, example embodiments of the present invention will be described using the drawings. Note that the same constituents will be designated by the same reference signs in all of the drawings, and descriptions of such constituents will not be repeated.

Example Embodiment 1

Figure 1:
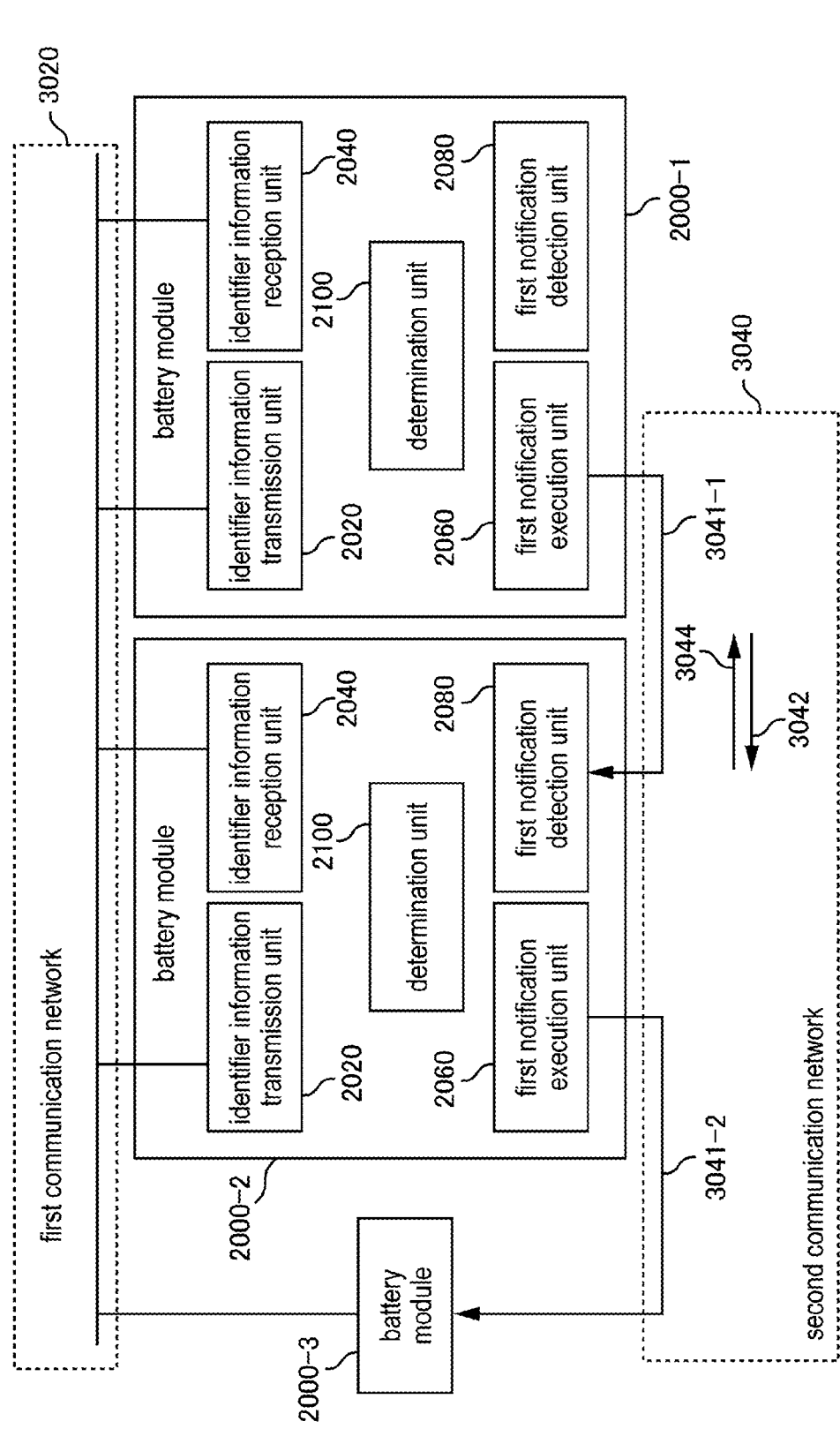
FIG. 1 is a block diagram illustrating an information processing system according to Example Embodiment 1.

FIG. 1 is a block diagram illustrating an information processing system 3000 according to Example Embodiment 1. In FIG. 1, each block does not represent a configuration of hardware units but represents a configuration of function units.

The information processing system 3000 includes a first communication network 3020, a second communication network 3040, and a plurality of battery modules 2000. The first communication network 3020 is a communication network that communicably connects the battery modules 2000 to each other. Each battery module 2000 can communicate with another battery module 2000 included in the information processing system 3000 through the first communication network 3020.

The second communication network 3040 is a communication network that is configured in a linear topology. Each battery module 2000 can communicate with another adjacent battery module 2000 on the second communication network 3040. The battery modules 2000 that are adjacent to each other are connected through a signal line 3041. In FIG.

1, a battery module 2000-1 can communicate with a battery module 2000-2 through a signal line 3041-1. In addition, the battery module 2000-2 can communicate with a battery module 2000-3 through a signal line 3041-2.

Note that the topology of the first communication network 3020 may be any topology in which the battery modules 2000 communicate with each other. For example, the topology of the first communication network 3020 is a bus topology.

In the battery module 2000, an identifier is set to be used in communication through the first communication network 3020. Hereinafter, the identifier will be called a first identifier. The battery module 2000 has a function of determining whether or not the first identifier of the battery module 2000 is a duplicate of the first identifier of another battery module 2000. To do so, the battery module 2000 includes an identifier information transmission unit 2020, an identifier information reception unit 2040, a first notification execution unit 2060, a first notification detection unit 2080, and a determination unit 2100.

The identifier information transmission unit 2020 transmits identifier information to all of the other battery modules 2000 through the first communication network 3020. The identifier information transmitted by a certain battery module 2000 (1) indicates the first identifier set in the battery module 2000 or (2) indicates the fact that the first identifier is not set in the battery module 2000.

The identifier information reception unit 2040 receives the identifier information transmitted by another battery module 2000 through the first communication network 3020.

The first notification execution unit 2060 performs first notification through the second communication network 3040. The first notification is notification of transmission of the identifier information by the identifier information transmission unit 2020 of the battery module 2000. The first notification execution unit 2060 performs the first notification for another battery module 2000 that is adjacent to the battery module 2000 in a first direction 3042 on the second communication network 3040.

The first notification detection unit 2080 detects the first notification through the second communication network 3040. The first notification is notification performed by another battery module 2000 that is adjacent to the battery module 2000 in a second direction 3044 on the second communication network 3040. The first direction 3042 and the second direction 3044 are directions that are opposite to each other. For example, from the viewpoint of the battery module 2000-1 that is adjacent to the battery module 2000-2 in the second direction 3044 on the second communication network 3040, the battery module 2000-2 is positioned in the first direction 3042 in the second communication network 3040.

The determination unit 2100 determines whether or not the first identifier of the battery module 2000 is a duplicate of the first identifier of another battery module 2000. The determination is executed in response to that the identifier information is transmitted by all battery modules 2000. In addition, the determination uses the identifier information received from another battery module 2000.

In the information processing system 3000, the identifier information transmission unit 2020 of a particular battery module 2000 transmits the identifier information based on a predetermined event other than detection of the first notification by the first notification detection unit 2080 of the battery module 2000. Hereinafter, this battery module 2000 will be called a starter battery module. On the other hand, the identifier information transmission unit 2020 of the battery module 2000 other than the starter battery module transmits the identifier information based on the fact that the first notification is detected by the first notification detection unit 2080 of the battery module 2000.

The first direction 3042 described above is a direction away from the starter battery module. On the other hand, the second direction 3044 is a direction toward the starter battery module. Thus, the starter battery module does not have the adjacent battery module 2000 in the second direction 3044 in the second communication network 3040. For example, in FIG. 1, the battery module 2000-1 is the starter battery module. Thus, any of directions from the battery module 2000-1 toward the battery module 2000-2 and directions from the battery module 2000-2 toward the battery module 2000-3 are the first direction 3042. On the other hand, any of directions from the battery module 2000-3 toward the battery module 2000-2 and directions from the battery module 2000-2 toward the battery module 2000-1 are the second direction 3044. Note that hereinafter, the battery module 2000-1 will also be referred to as the starter battery module 2000-1.

<Flow of Process>

Figure 2:
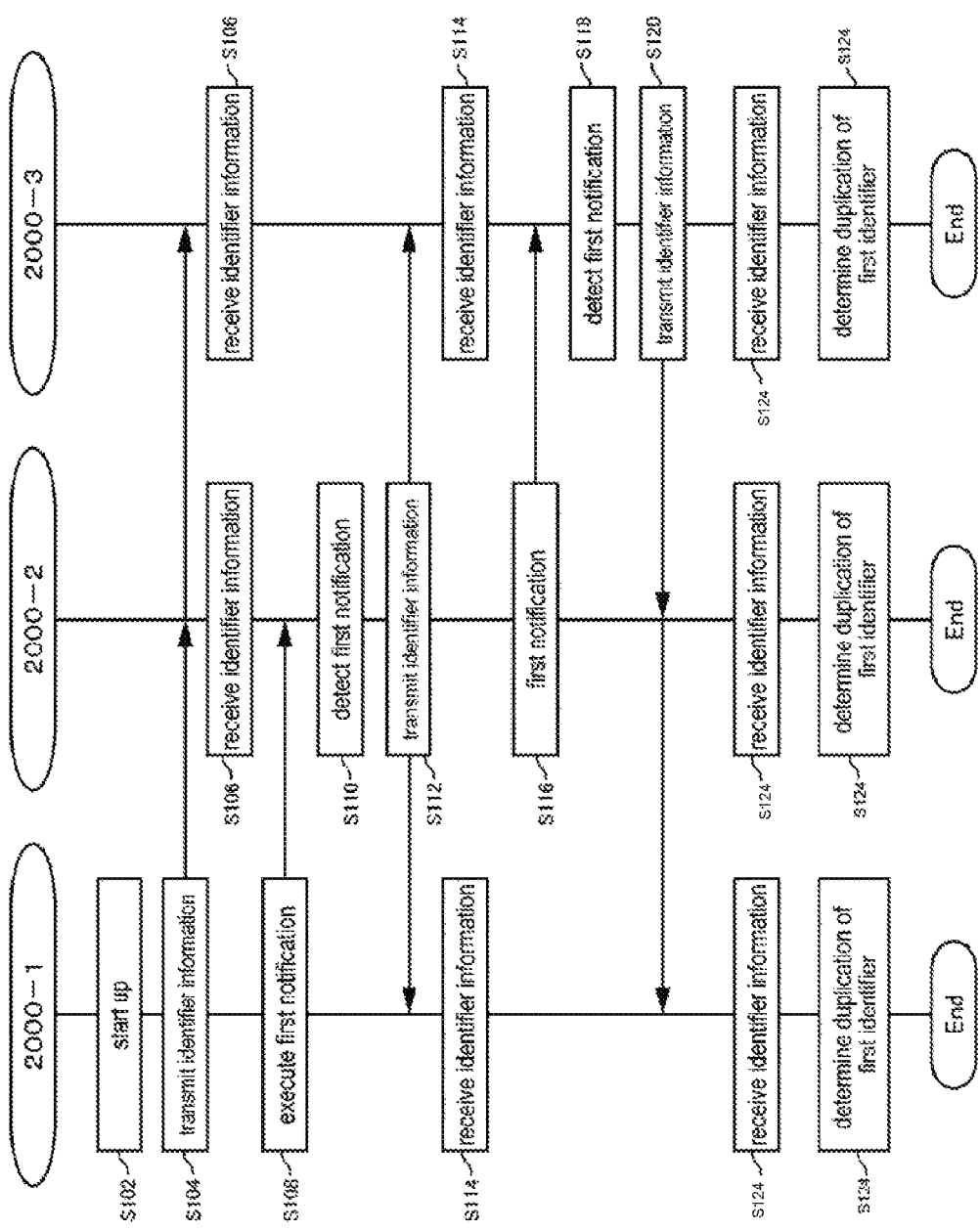
FIG. 2 is a flowchart illustrating a flow of process in the information processing system of Example Embodiment 1.

FIG. 2 is a flowchart illustrating a flow of process in the information processing system 3000 of Example Embodiment 1. The battery module 2000-1, being the starter battery module, transmits the identifier information (S104) in response to its start-up (S102). The battery module 2000-2 and the battery module 2000-3 receive the identifier information transmitted by the battery module 2000-1 (S106). The battery module 2000-1 performs the first notification for the battery module 2000-2 through the signal line 3041-1 (S108).

The battery module 2000-2 transmits the identifier information (S112) based on the fact that the first notification is detected (S110). The battery module 2000-1 and the battery module 2000-3 receive the identifier information transmitted by the battery module 2000-2 (S114). The battery module 2000-2 performs the first notification for the battery module 2000-3 through the signal line 3041-2 (S116).

The battery module 2000-3 transmits the identifier information (S120) based on the fact that the first notification is detected (S118). The battery module 2000-1 and the battery module 2000-2 receive the identifier information transmitted by the battery module 2000-3 (S122).

Each battery module 2000 determines whether or not its first identifier is a duplicate of the first identifier of another battery module 2000 (S124).

Note that the flow of process performed by the information processing system 3000 is not limited to the flow illustrated in FIG. 2. Other flows of process will be described below.

<Advantageous Effect>

According to the information processing system 3000 of the present example embodiment, a determination as to whether or not duplication of the identifier occurs between the battery modules 2000 is automatically performed using the identifier information transmitted from each battery module 2000. Thus, duplication of the identifier between the battery modules 2000 can be efficiently detected.

Hereinafter, the present example embodiment will be described in further detail.

<Hardware Configuration Example of Battery Module 2000>

Each functional configuration unit of the battery module 2000 may be implemented by hardware (example: a hard-wired electronic circuit) that implements each functional configuration unit, or may be implemented by a combination of hardware and software (example: a combination of an electronic circuit and a program controlling the electronic circuit). Hereinafter, a case where each functional configuration unit of the battery module 2000 is implemented by a combination of hardware and software will be further described.

Figure 3:
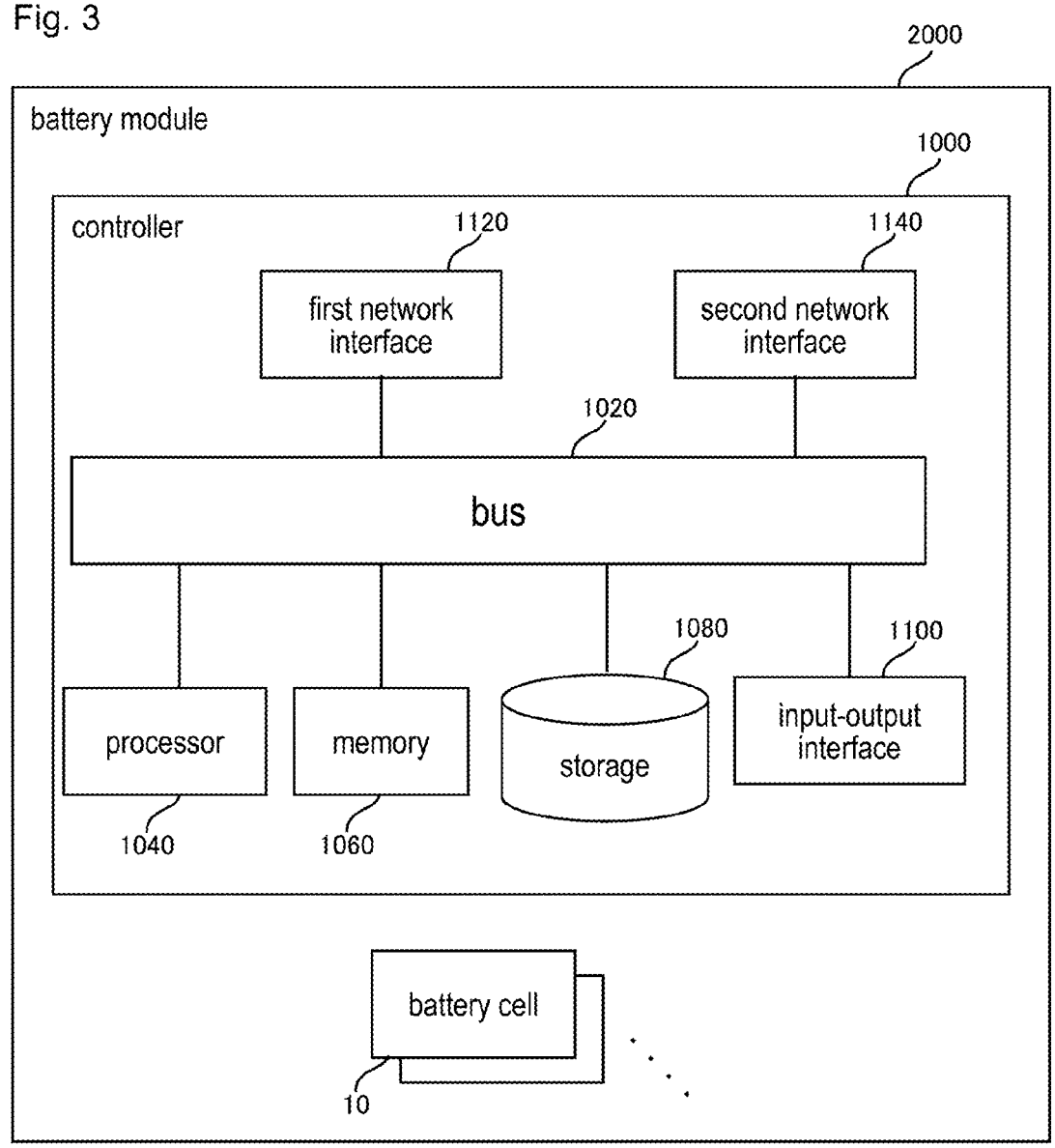
FIG. 3 is a diagram illustrating a hardware configuration of a battery module.

FIG. 3 is a diagram illustrating a hardware configuration of the battery module 2000. The battery module 2000 includes a controller 1000 and a battery cell 10. The battery cell 10 is a secondary battery such as a lithium ion battery. The controller 1000 is a device that controls charging or discharging of the battery cell 10 or exchanges control information with the controller 1000 included in another battery module 2000. For example, the controller 1000 is a battery management unit (BMU).

The controller 1000 includes a bus 1020, a processor 1040, a memory 1060, a storage 1080, an input-output interface 1100, a first network interface 1120, and a second network interface 1140. The bus 1020 is a data transfer path for transmitting and receiving data among the processor 1040, the memory 1060, the storage 1080, the input-output interface 1100, and the first network interface 1120. A method of connecting the processor 1040 and the like is not limited to bus connection. The processor 1040 is a processor such as a micro processing unit (MPU) or a central processing unit (CPU). The memory 1060 is a memory such as a random access memory (RAM) or a read only memory (ROM). The storage 1080 is a storage device such as a flash memory. The input-output interface 1100 is an interface for connecting the controller 1000 and input-output devices.

The first network interface 1120 is an interface that connects the controller 1000 and the first communication network 3020. The identifier information transmission unit 2020 realizes transmission of the identifier information by outputting the identifier information to the first network interface 1120. The identifier information transmission unit 2020 realizes reception of the identifier information by acquiring the identifier information received by the first network interface 1120. The second network interface 1140 is an interface that connects the controller 1000 and the second communication network 3040. A method of realizing transmission notification will be described below.

The storage 1080 stores a program module that implements each functional configuration unit of the battery module 2000. The processor 1040 implements each function corresponding to the program module by reading each program module into the memory 1060 and executing the program module.

The hardware configuration of the controller 1000 is not limited to the configuration illustrated in FIG. 3. For example, each program module may be stored in the memory 1060. In this case, the controller 1000 may not include the storage 1080.

<Identifier Information>

The identifier information transmitted by the identifier information transmission unit 2020 of the battery module 2000 represents the identifier of the battery module 2000 in the first communication network 3020. For example, in a case where the first communication network 3020 is a CAN communication network, the identifier information represents an identifier (ID) in the CAN communication network. Hereinafter, the ID in the CAN communication network will be referred to as a CAN-ID.

FIG. 4 is a diagram illustrating a data structure of the identifier information in the CAN communication network. The identifier information in FIG. 4 is 8-byte data. The 0th byte to the 3rd byte of the identifier information indicate a manufacturing number of the battery module 2000. The 4th byte of the identifier information indicates the CAN-ID (first identifier) of the battery module 2000. The 5th byte of the identifier information indicates status data of the battery module 2000. Data included in the 6th byte and the 7th byte of the identifier information is arbitrary.

There are various methods of using the status data of the identifier information. For example, the status data of the identifier information transmitted by the starter battery module 2000 is set to indicate whether or not the transmission destination of the identifier information is the starter battery module 2000. For example, the 0th bit of the status data is used as a flag that indicates whether or not the transmission destination is the starter battery module 2000.

In addition, for example, the status data of the identifier information transmitted by the battery module 2000 (hereinafter, the terminal battery module 2000) that is at a terminal position in the first direction 3042 in the second communication network 3040 is set to indicate whether or not the transmission destination of the identifier information is the terminal battery module 2000. For example, the 1st bit of the status data is used as a flag that indicates whether or not the transmission source is the starter battery module 2000. Note that in FIG. 1, the terminal battery module 2000 is the battery module 2000-3.

Note that the data structure of the identifier information illustrated in FIG. 4 can also be employed in a case where the first communication network 3020 is a communication network other than the CAN communication network. However, the size or the like of the first identifier varies depending on a communication protocol used in the communication network. In this case, the data size of the identifier information is appropriately set in accordance with the communication protocol.

<Transmission of Identifier Information: S104 and Like>

The identifier information transmission unit 2020 transmits the identifier information in the first communication network 3020. A well-known technique can be used for a technique for transmitting information through the CAN communication network or the like.

The identifier information transmission unit 2020 of the battery module 2000 other than the starter battery module transmits the identifier information based on the fact that the first notification is detected by the first notification detection unit 2080. In this case, the identifier information transmission unit 2020 may transmit the identifier information at a time point at which the first notification is detected by the first notification detection unit 2080, or may transmit the identifier information at an arbitrary time point other than the time point at which the first notification is detected by the first notification detection unit 2080. For example, an arbitrary time point after detection of the first notification is a time point being a predetermined time period after detecting the first notification. The predetermined time period may be set in the identifier information transmission unit 2020 or may be stored in a storage device that can be accessed from the identifier information transmission unit 2020.

On the other hand, the starter battery module transmits the identifier information based on a predetermined event other than the event that the first notification is detected by the first notification detection unit 2080. For example, the predetermined event is an event that the starter battery module is started up. That is, in this case, the starter battery module transmits the identifier information at the time of start-up. In the flowchart of FIG. 2 described above, the starter battery module transmits the identifier information based on its start-up. The start-up of the starter battery module may be a normal start-up caused by an operation such as turning on a power supply switch, or may be start-up caused by a recovery from a malfunction such as a power outage.

Note that the time of start-up referred hereto does not need to be immediately after start-up. For example, the starter battery module transmits the identifier information after various kinds of initial setting are performed after start-up. In addition, for example, the starter battery module may transmit the identifier information after a predetermined time period elapses from the initial setting. A timing at which the battery module 2000 other than the starter battery module is started up may be later than a timing at which the starter battery module is started up. In this case, in a case where the identifier information is transmitted immediately after the initial setting of the starter battery module is completed, there is a possibility that the initial setting of another battery module 2000 is not completed, and the other battery module 2000 does not correctly receive the identifier information. In a case where transmission of the identifier information is delayed until a predetermined time period elapses from completion of the initial setting in the starter battery module, a time period in which the other battery module 2000 performs the initial setting is secured, and the probability of the other battery module 2000 being able to correctly receive the identifier information is increased.

In addition, for example, the predetermined event is completion of charging of the battery cell 10 in the starter battery module. That is, in this case, the starter battery module transmits the identifier information based on the fact that charging of the battery cell 10 in the starter battery module is completed. Note that, a well-known technique can be uses for a method of detecting completion of charging of the battery cell 10.

In addition, for example, the predetermined event is an event that a new battery module 2000 is added to the information processing system 3000. For example, the battery module 2000 is newly added to the information processing system 3000 after a series of processes (for example, the series of processes in FIG. 2) for determining duplication of the first identifier is performed once in the information processing system 3000. In this case, there is a possibility that the first identifier of the newly added battery module 2000 is a duplicate of the first identifier of another battery module 2000. Thus, duplication of the first identifier needs to be determined again in the information processing system 3000.

Therefore, the starter battery module transmits the identifier information based on the fact that the new battery module 2000 is added to the information processing system 3000. In addition, the remaining processes (for example, the processes after S106 in FIG. 2) needed for determining duplication of the first identifier are performed in order. Consequently, duplication of the first identifier is determined by each of all battery modules 2000 included in the information processing system 3000 including the newly added battery module 2000. Note that the operation of the information processing system 3000 in a case where the new battery module 2000 is added to the information processing system 3000 will be described in detail below.

<<Determination of Starter Battery Module>>

At a predetermined timing, each battery module 2000 determines whether or not the battery module 2000 is the starter battery module. Then, the identifier information is transmitted from the identifier information transmission unit 2020 of the battery module 2000 that has determined that it is the starter battery module. The predetermined timing is a timing of transmission of the identifier information by the starter battery module (at the time of start-up or the like), or a timing before the timing of transmission. The predetermined timing may be set in advance in the battery module 2000 or may be stored in a storage device that can be accessed from the battery module 2000.

There are various methods of determining whether or not the battery module 2000 is the starter battery module. For example, the battery module 2000 determines whether or not the battery module 2000 is the starter battery module based on a connection state between the battery module 2000 and another battery module 2000. A port to which the signal line 3041 linking the battery module 2000 and the adjacent battery module 2000 in the first direction 3042 in the second communication network 3040 is connected is called a first port. A port to which the signal line 3041 linking the battery module 2000 and the adjacent battery module 2000 in the second direction 3044 in the second communication network 3040 is connected is called a second port. For example, in the case of the battery module 2000-2, a port to which the signal line 3041-2 is connected is the first port, and a port to which the signal line 3041-1 is connected is the second port. In this case, the battery module 2000 determines whether or not the battery module 2000 is the starter battery module in a case where the signal line 3041 is not connected to the second port, or in a case where the signal line 3041 connected to the second port is not conducted.

<Reception of Identifier Information: S106 and Like>

The identifier information reception unit 2040 receives the identifier information. A well-known technique can be used for a technique for receiving information transmitted through the CAN communication network or the like.

Figure 5:
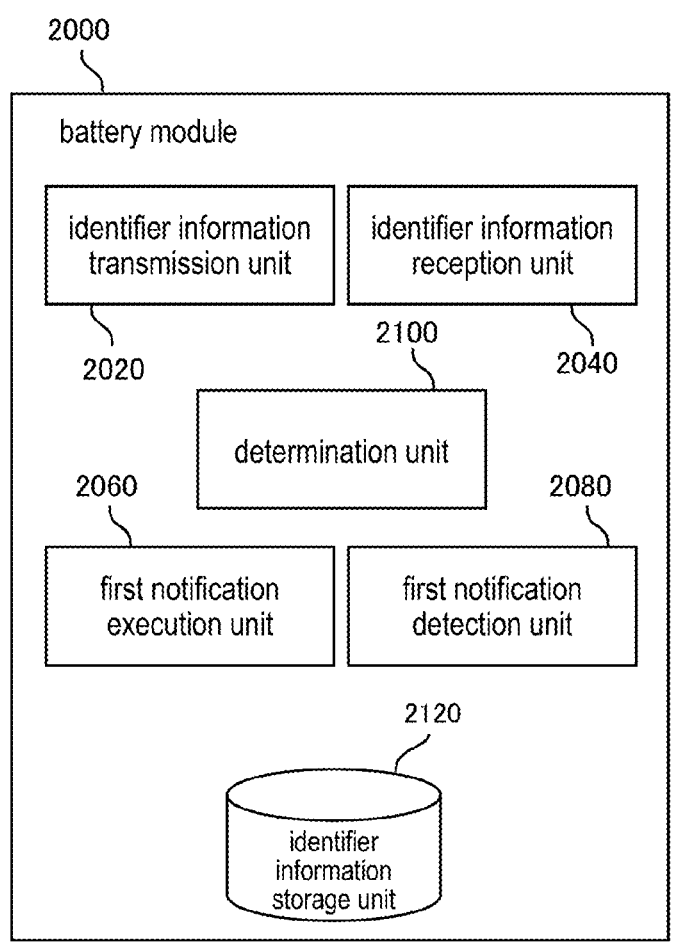
FIG. 5 is a block diagram illustrating the battery module including an identifier information storage unit.

For example, the identifier information reception unit 2040 writes the received identifier information into a storage device. Hereinafter, the storage device in which the identifier information is stored will be called an identifier information storage unit. FIG. 5 is a block diagram illustrating the battery module 2000 including the identifier information storage unit. An identifier information storage unit 2120 is implemented by, for example, the memory 1060 or the storage 1080.

<Execution of First Notification: S108 and Like>

The first notification execution unit 2060 performs the first notification in response to the fact that the identifier information is transmitted by the battery module 2000. The first notification is performed using the second communication network 3040. The first notification is any notification that enables the battery module 2000 connected to the battery module 2000 through the second communication network 3040 to recognize that the identifier information is transmitted by the battery module 2000.

For example, the first notification execution unit 2060 performs the first notification by changing the voltage of the signal line 3041 connecting the battery module 2000 and the battery module 2000 of the notification destination (the battery module 2000 adjacent to the battery module 2000 in the first direction 3042 in the second communication network 3040).

More specifically, the first notification execution unit 2060 performs the first notification by switching the voltage of the signal line 3041 between a relatively lower value (hereinafter, a low value) and a relatively higher value (hereinafter, a high value). In this case, each battery module 2000 sets the voltage of the signal line 3041 to the high value after start-up. Then, the first notification execution unit 2060 performs the first notification by changing the voltage of the signal line 3041 to the low value. A well-known technique can be used for a method of changing the value of the voltage of the signal line 3041.

Note that the high value and the low value can be set to any value, provided that the high value is greater than the low value, and that there is enough difference between those voltages to distinguished them. In addition, the voltage of the signal line 3041 before the first notification is performed may be set to the low value, and the first notification may be performed by changing the voltage of the signal line 3041 to the high value.

<Detection of First Notification: S110 and Like>

The first notification detection unit 2080 detects the first notification that is performed by the adjacent battery module 2000 in the second direction 3044 in the second communication network 3040. More specifically, the first notification detection unit 2080 detects the first notification using the signal line 3041 that connects the battery module 2000 and the adjacent battery module 2000 in the second direction 3044 in the second communication network 3040.

For example, as described above, the first notification is performed by changing the voltage of the signal line 3041 from the high value to the low value. In this case, the first notification detection unit 2080 detects the first notification by detecting a change in the voltage of the signal line 3041 connecting the battery module 2000 and another adjacent battery module 2000 in the second direction 3044 in the second communication network 3040 from the high value to the low value. A well-known technique can be used for a method of detecting a change in the value of the voltage of the signal line 3041.

<Determination of Duplication of First Identifier: S124>

The determination unit 2100 determines whether or not the identifier of the battery module 2000 is a duplicate of the first identifier of another battery module 2000 using the identifier information received from each of the other battery modules 2000. Specifically, in a case where the identifier information that indicates the same first identifier as the battery module 2000 is present in the identifier information stored in the identifier information storage unit 2120, the determination unit 2100 determines that there is duplication of the first identifier between the battery module 2000 and the battery module 2000 corresponding to that identifier information. On the other hand, in a case where the identifier information that indicates the same first identifier as the battery module 2000 is not present in the identifier information stored in the identifier information storage unit 2120, the determination unit 2100 determines that the first identifier of the battery module 2000 is not a duplicate of the first identifier of any of the other battery modules 2000.

<Timing at which Determination Unit 2100 Operate>

The determination unit 2100 determines duplication between the first identifier of the battery module 2000 and the first identifier of another battery module 2000 in response to the fact that the identifier information is transmitted by all battery modules 2000. There are various methods for the determination unit 2100 to recognize transmission of the identifier information by all battery modules 2000. Hereinafter, several recognition methods will be illustrated.

<<Recognition Method 1>>

The determination unit 2100 of the terminal battery module recognizes transmission of the identifier information by all battery modules 2000 in response to the fact that the identifier information is transmitted by the identifier information transmission unit 2020 of the terminal battery module. On the other hand, the determination unit 2100 of the battery module 2000 other than the terminal battery module recognizes transmission of the identifier information by all battery modules 2000 in response to the fact that the identifier information transmitted by the terminal battery module is received.

As described above, for example, the identifier information includes the flag that indicates whether or not the transmission source of the identifier information is the terminal battery module. Therefore, in the identifier information transmitted by the identifier information transmission unit 2020 of the terminal battery module, the value of the flag is set to 1. On the other hand, in the identifier information transmitted by the identifier information transmission unit 2020 of the battery module 2000 other than the terminal battery module, the value of the flag is set to 0.

The determination unit 2100 of the battery module 2000 other than the terminal battery module 2000 recognizes transmission of the identifier information by all battery modules 2000 based on the fact that the identifier information in which the flag is equal to 1 is received.

<<Recognition Method 2>>

The number of battery modules 2000 included in the information processing system 3000 is predetermined. In this case, the determination unit 2100 recognizes transmission of the identifier information by all battery modules 2000 in a case where the number of pieces of identifier information received by the identifier information reception unit 2040 is equal to the number (the total number of battery modules 2000 except the own battery module 2000) acquired by subtracting 1 from the number of battery modules 2000 included in the information processing system 3000. The total number of battery modules 2000 except the own battery module 2000 may be set in advance in the determination unit 2100 or may be stored in a storage device that can be accessed from the determination unit 2100.

<<Recognition Method 3>>

Figure 6:
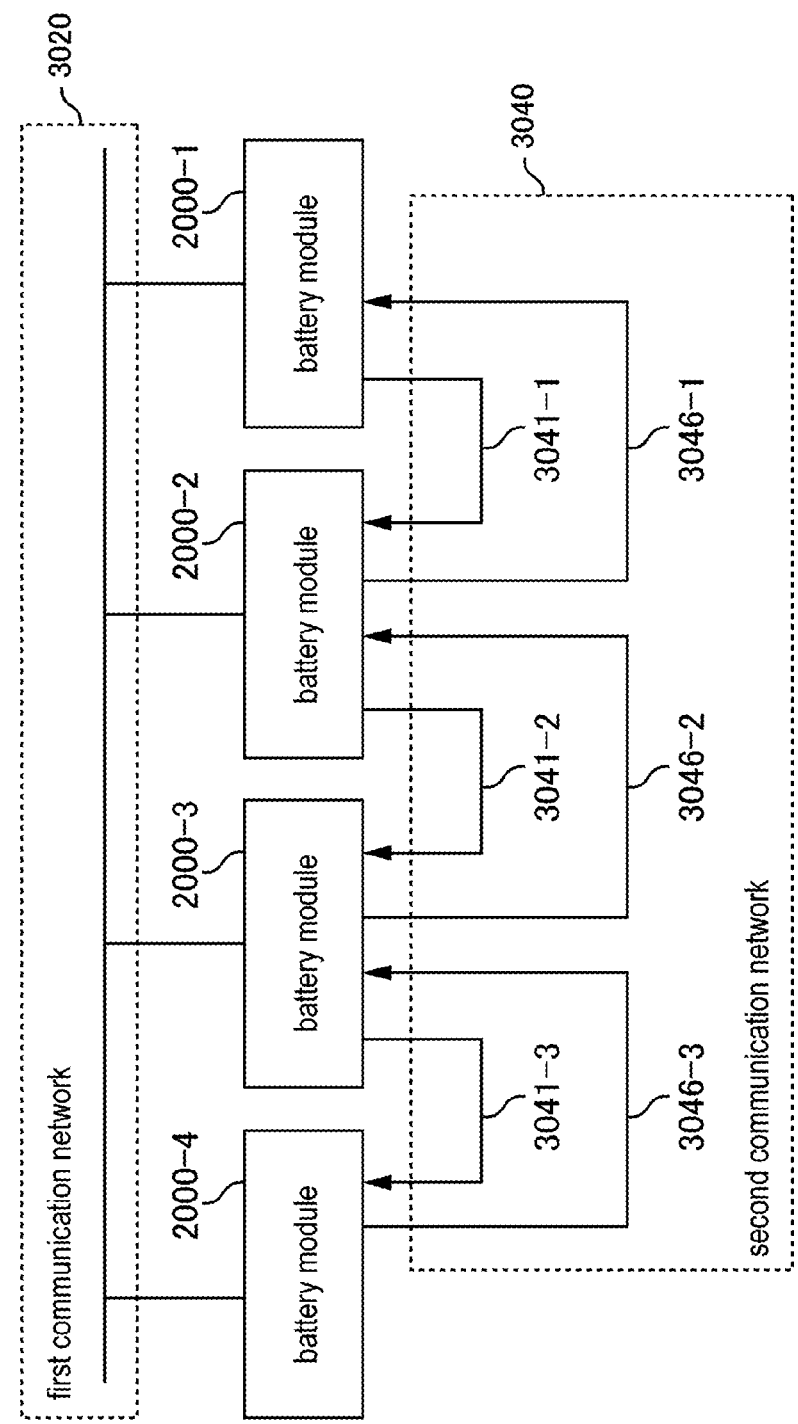
FIG. 6 is a block diagram illustrating the information processing system including a second signal line.

In this method, it is assumed that the second communication network 3040 includes a second signal line 3046 in addition to the signal line 3041. FIG. 6 is a block diagram illustrating the information processing system 3000 including the second signal line 3046. In FIG. 6, an internal configuration of the battery module 2000 is not illustrated for easy understanding of the drawing.

As described above, the signal line 3041 is used in order for each battery module 2000 to perform notification (first notification) for another adjacent battery module 2000 in the first direction 3042 in the second communication network 3040. To the contrary, the second signal line 3046 used in order for each battery module 2000 to perform notification for another adjacent battery module 2000 in the second direction 3044 in the second communication network 3040. Hereinafter, a detailed description will be provided.

The battery module 2000 (in FIG. 6, a battery module 2000-4) that does not have the adjacent battery module 2000 in the first direction 3042 in the second communication network 3040 performs notification through the second signal line 3046 after transmitting the identifier information. This notification is called second notification. The second notification is notification that represents transmission of the identifier information by the battery module 2000 at a terminal position in the first direction 3042 in the second communication network 3040. In other words, the second notification is notification that represents transmission of the identifier information by all battery modules 2000. By detecting the second notification, the battery module 2000 can recognize transmission of the identifier information by all battery modules 2000.

The battery module 2000 that detects the second notification performed by the adjacent battery module 2000 in the first direction 3042 also performs the second notification for the adjacent battery module 2000 in the second direction 3044. By doing so, for example, in FIG. 6, the second notification is performed for the battery module 2000-3 from the battery module 2000-4, the second notification is performed for the battery module 2000-2 from the battery module 2000-3, and the second notification is performed for the battery module 2000-1 from the battery module 2000-2. Consequently, all battery modules 2000 except the battery module 2000 at a terminal position in the first direction 3042 receive the second notification. Thus, all battery modules 2000 can recognize transmission of the identifier information by all battery modules 2000.

Note that a method of performing the second notification using the second signal line 3046, and a method of detecting the second notification are the same as the method of performing the first notification through the signal line 3041, and the method of detecting the first notification, respectively.

Figure 7:
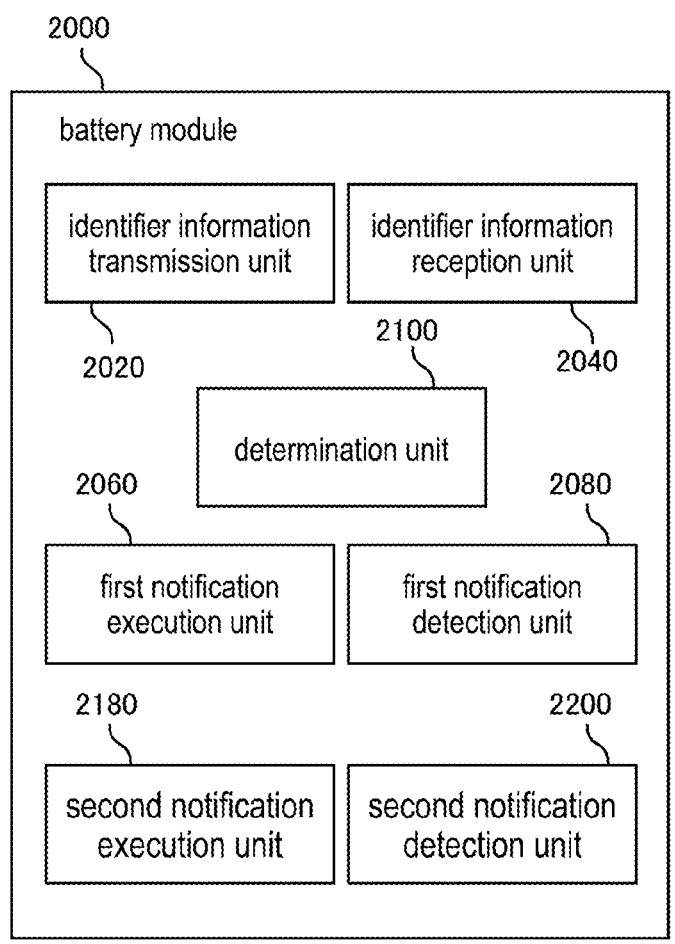
FIG. 7 is a block diagram illustrating a battery module 2000 having a function of executing and detecting second notification.

FIG. 7 is a block diagram illustrating the battery module 2000 having a function of executing and detecting the second notification. A second notification execution unit 2180 performs the second notification for another adjacent battery module 2000 in the second direction 3044 in the second communication network 3040. A second notification detection unit 2200 detects the second notification that is performed by another adjacent battery module 2000 in the first direction 3042 in the second communication network 3040.

<<Recognition Method 4>>

The determination unit 2100 may estimate "transmission of the identifier information by all battery modules 2000" in a case where a predetermined time period elapses from a timing at which the first identifier information is received by the identifier information reception unit 2040, or in a case where a predetermined time period elapses from a timing at which the first notification is detected by the first notification detection unit 2080. The predetermined time period may be set in advance in the determination unit 2100 or may be stored in a storage device that can be accessed from the determination unit 2100.

<Operation in Case where Battery Module 2000 is Newly Added>

As described above, the starter battery module transmits the identifier information in response to the fact that the new battery module 2000 is added to the information processing system 3000. By doing so, duplication of the first identifier is determined by each of all battery modules 2000 included in the information processing system 3000 including the added battery module 2000. Hereinafter, the operation of the information processing system 3000 in a case where the battery module 2000 is newly added will be specifically described.

Each battery module 2000 repeatedly monitors the voltage of the second port (the port to which the signal line 3041 connecting the battery module 2000 and the battery module 2000 positioned in the second direction 3044 when seen from the battery module 2000 is connected). The battery module 2000 that detects a change in the voltage from the low value to the high value (a change that is opposite to the change caused by the first notification) transmits a predetermined request through the first communication network 3020. Note that the initial value of the voltage of the second port is the low value. The starter battery module transmits the identifier information with reception of the predetermined request as a trigger. The predetermined request will be described below.

Figure 8:
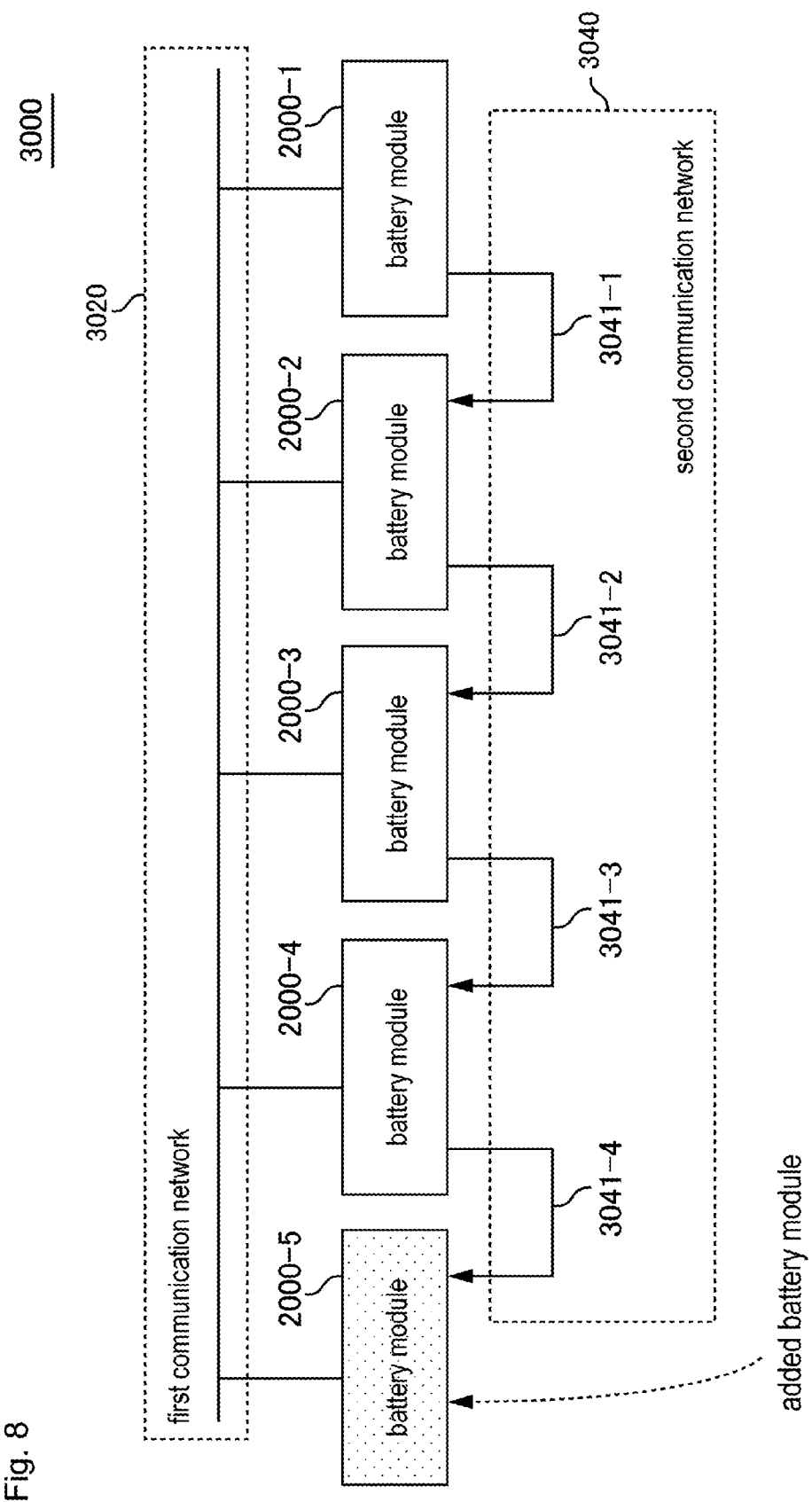
FIG. 8 is a diagram representing a case where the battery module is added as a new terminal battery module.
Figure 9:
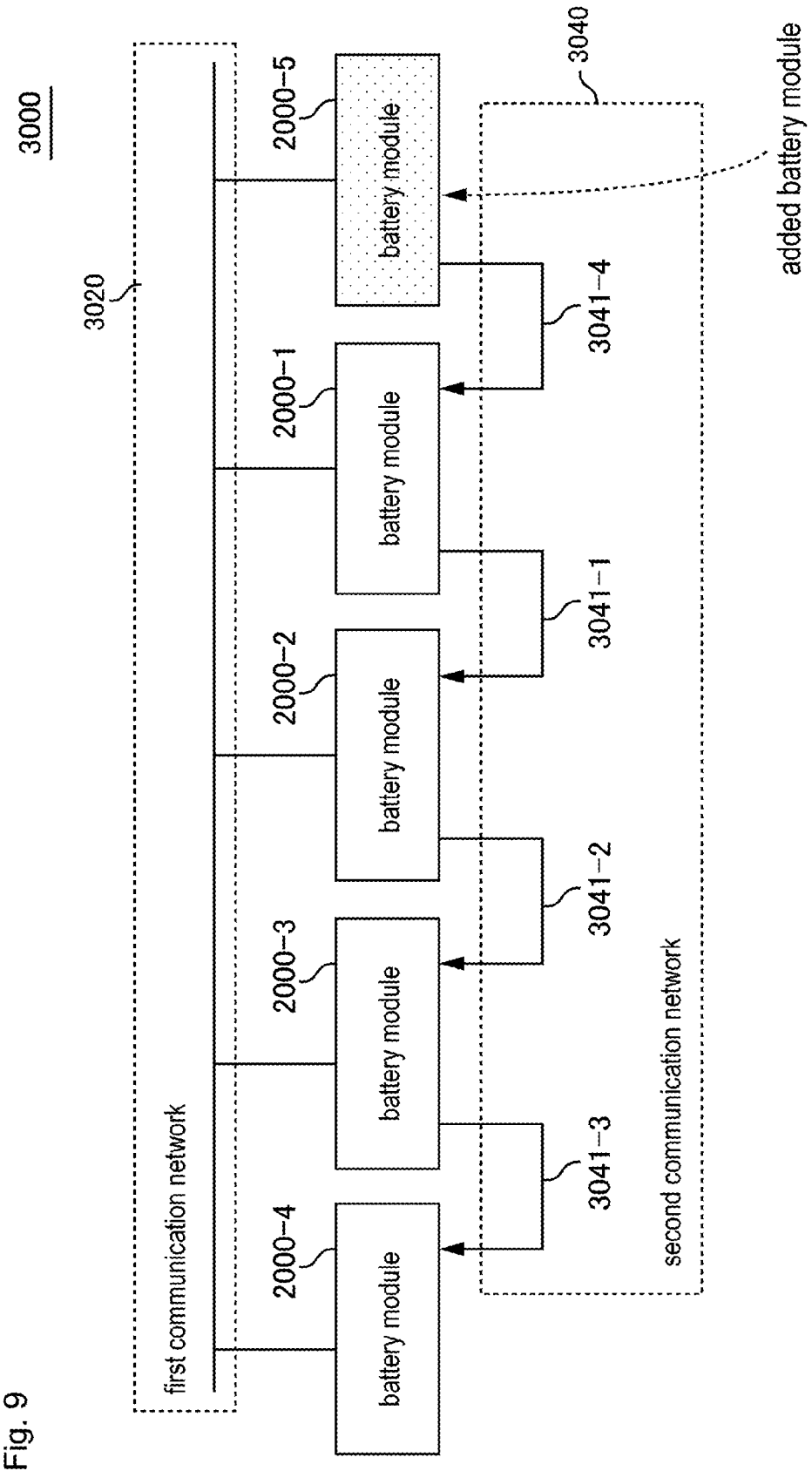
FIG. 9 is a diagram representing a case where the battery module is added as a new starter battery module.
Figure 10:
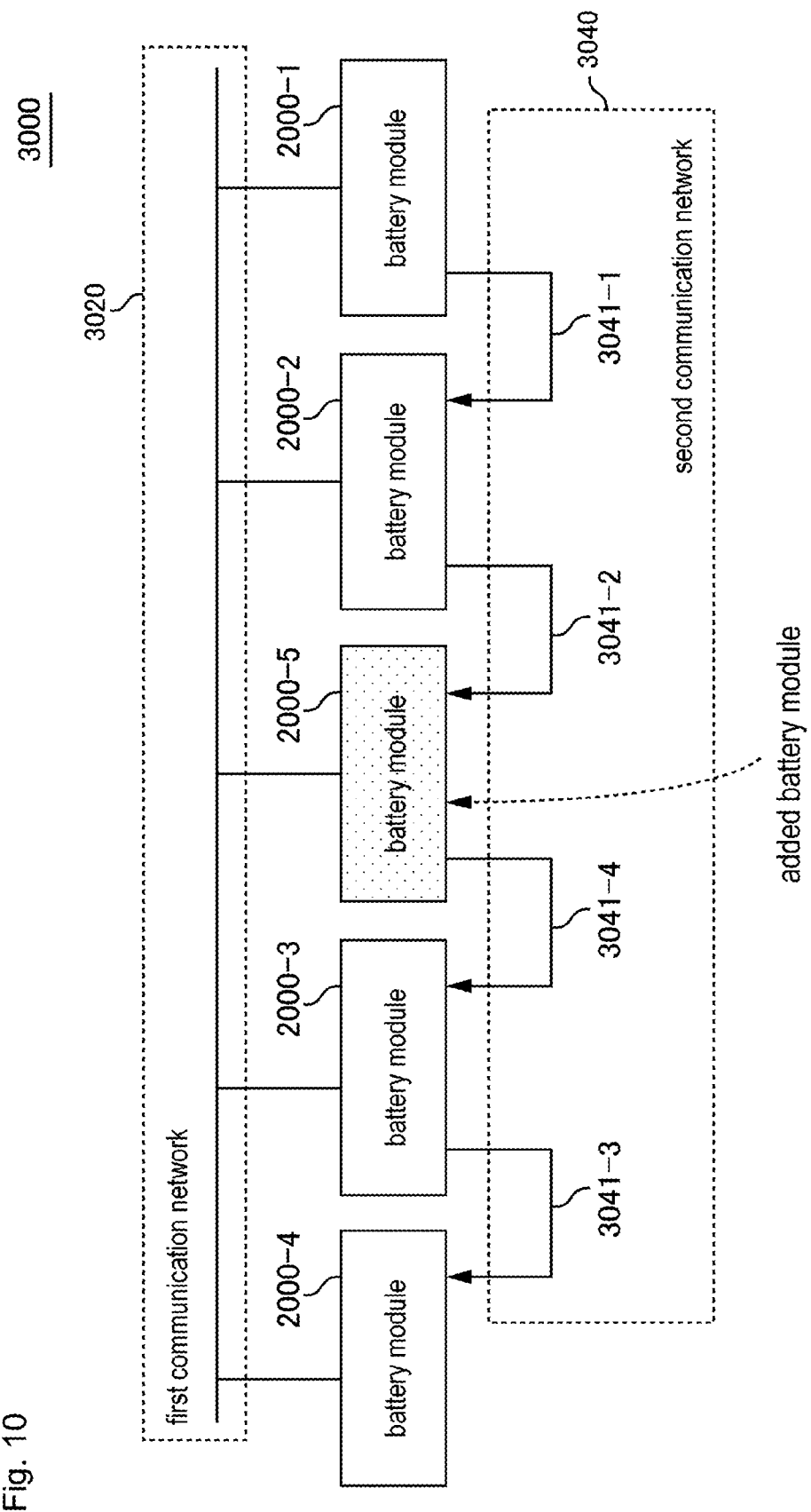
FIG. 10 is a diagram representing a case where the battery module that is added is neither a new terminal battery module nor a new starter battery module.

The operation of the information processing system 3000 will be described in further detail using the drawings. FIG. 8 to FIG. 10 are diagrams illustrating a state where the new battery module 2000 is added. In any of the examples in the drawings, a battery module 2000-5 (battery module 2000 filled with dot) is the added battery module 2000. The determination about duplication of the first identifier has already been performed for the battery module 2000-1 to the battery module 2000-4.

FIG. 8 is a diagram representing a case where the battery module 2000 is added as a new terminal battery module. The first notification execution unit 2060 of the terminal battery module does not execute the first notification after transmitting the identifier information. For example, in the example in FIG. 8, in a case where duplication of the first identifier is determined in the battery module 2000-1 to the battery module 2000-4, the battery module 2000-1 to the battery module 2000-3 execute the first notification, but the battery module 2000-4 does not execute the first notification. Thus, in the example in FIG. 8, the voltage of a signal line 3041-4 is at the high value while the voltages of the signal line 3041-1 to a signal line 3041-3 are at the low value.

Thus, the battery module 2000-5 detects a change in the voltage of the second port from the low value to the high value in response to connection of the battery module 2000-4 and the battery module 2000-5 through the signal line 3041-4. Thus, the battery module 2000-5 transmits the predetermined request.

FIG. 9 is a diagram representing a case where the battery module 2000 is added as a new starter battery module. In the case in FIG. 9, the voltages of the signal line 3041-1 to the signal line 3041-3 are changed to the low value by the first notification. On the other hand, the voltage of the signal line 3041-4 is at the high value.

Thus, the battery module 2000-1 (the previous starter battery module) detects a change in the voltage of the second port from the low value to the high value in response to connection of the battery module 2000-1 and the battery module 2000-5 through the signal line 3041-4. Thus, the battery module 2000-1 transmits the predetermined request.

FIG. 10 is a diagram representing a case where the added battery module 2000 is neither a new terminal battery module nor a new starter battery module. Even in the case in FIG. 10, the voltage of the signal line 3041-4 is at the high value while the voltages of the signal line 3041-1 to the signal line 3041-3 are changed to the low value.

Thus, the battery module 2000-3 detects a change in the voltage of the second port from the low value to the high value in response to connection of the battery module 2000-3 and the battery module 2000-5 through the signal line 3041-4. Thus, the battery module 2000-3 transmits the predetermined request.

Note that in any of the example in FIG. 9 or the example in FIG. 10, the battery module 2000 that transmits the predetermined request is the battery module 2000 that is positioned in the first direction 3042 when seen from the added battery module 2000. On the other hand, in the example in FIG. 8, the battery module 2000 that transmits the predetermined request is the added battery module 2000.

<<Predetermined Request>>

For example, the predetermined request is data (hereinafter, request data) that is transmitted through the first communication network 3020. For example, the request data is data that has the same data structure as the identifier information illustrated in FIG. 4. However, a predetermined bit (for example, the 2nd bit) of the status data in the request data is set to 1, while the bit of the status data in the identifier information is set to 0. The starter battery module detects addition of the new battery module 2000 by receiving the data (request data) in which the bit is set to 1.

Modification Example of Example Embodiment 1

Figure 11:
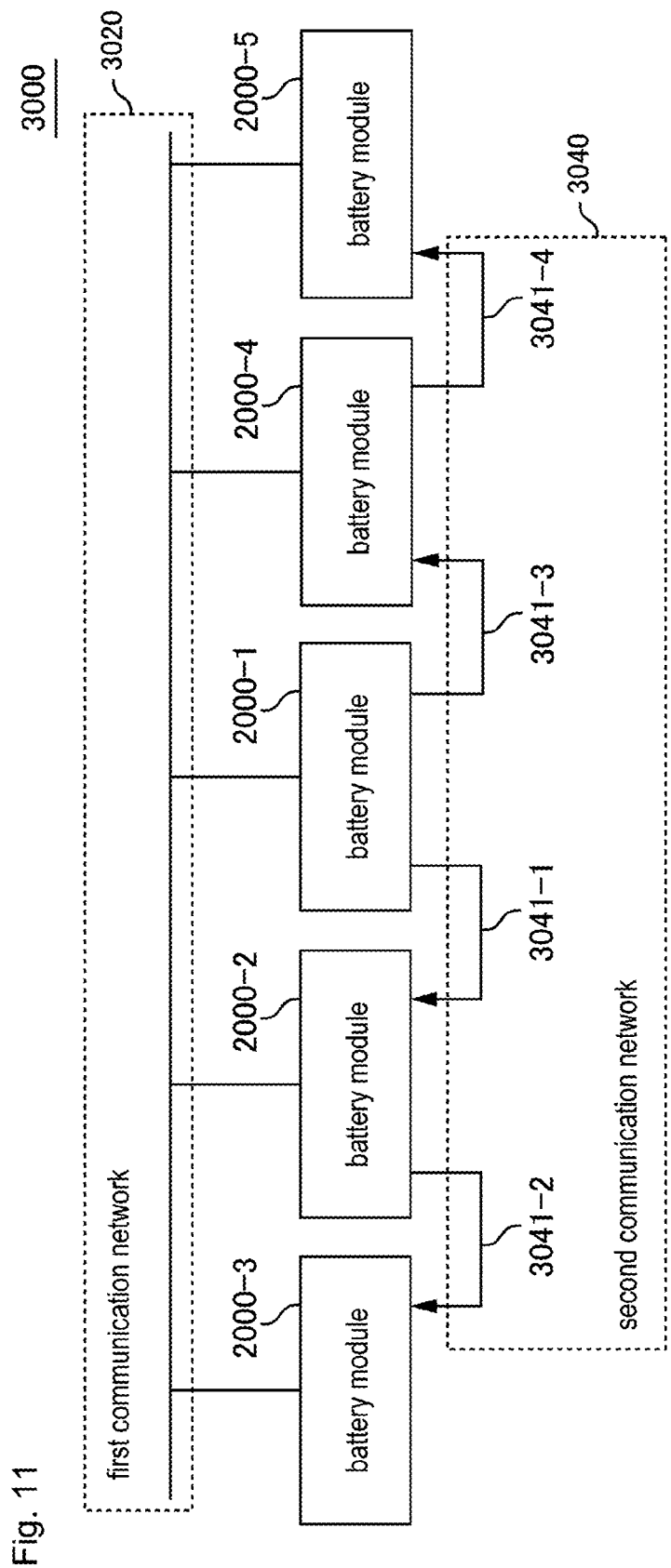
FIG. 11 is a block diagram illustrating an information processing system of Modification Example 1.

FIG. 11 is a block diagram illustrating the information processing system 3000 of Modification Example 1. In the present modification example, it is assumed a plurality of the battery modules 2000 are connected to the starter battery module 2000-1. Note that the function of the battery module 2000 of Modification Example 1 is the same as the function of the battery module 2000 of Example Embodiment 1 except for the points described below.

In FIG. 11, in order to simplify the following description, the battery module 2000-2 and the battery module 2000-3 are collectively called a group 1, and the battery module 2000-4 and the battery module 2000-5 are collectively called a group 2.

<Timing at which Starter Battery Module 2000-1 Performs First Notification>

The first notification execution unit 2060 of the starter battery module 2000-1 performs the first notification using any signal line 3041 after transmission of the identifier information is completed. For example, the first notification execution unit 2060 performs the first notification for the battery module 2000-2 at a timing at which transmission of the identifier information is completed. In this case, the starter battery module 2000-1 also performs the first notification for the battery module 2000-4 at a timing different from the timing at which the first notification is performed for the battery module 2000-2.

Specifically, the first notification execution unit 2060 of the starter battery module 2000-1 performs the first notification for the battery module 2000-3 after transmission of the identifier information by all battery modules 2000 included in the group 1 is completed. A method of recognizing completion of transmission of the identifier information by all battery modules 2000 included in the group 1 is the same as the method of recognizing transmission of the identifier information by all battery modules 2000 in Example Embodiment 1. For example, the first notification execution unit 2060 of the starter battery module 2000-1 recognizes transmission of the identifier information by all battery modules 2000 included in the group 1 in a case where the number of pieces of identifier information received by the identifier information reception unit 2040 becomes equal to the number of battery modules 2000 included in the group 1. In addition, for example, the first notification execution unit 2060 of the starter battery module 2000-1 recognizes transmission of the identifier information by all battery modules 2000 included in the group 1 by receiving the second notification from the battery module 2000-2. In addition, for example, the first notification execution unit 2060 of the starter battery module 2000-1 may estimate "transmission of the identifier information by all battery modules 2000 included in the group 1" in a case where a predetermined time period elapses from a timing at which the first identifier information is received by the identifier information reception unit 2040, or in a case where a predetermined time period elapses from a timing at which the first notification by the battery module 2000-2 is detected by the first notification detection unit 2080.

<Timing at which Duplication of First Identifier is Determined>

The determination unit 2100 determines duplication of the first identifier in response to the fact that transmission of the identifier information by all battery modules 2000 included in the group is completed. The starter battery module 2000-1 can recognize transmission of the identifier information by all battery modules 2000 included in a certain group using the above various methods. Thus, the determination unit 2100 of the starter battery module 2000-1 determines duplication of the first identifier in a case where transmission of the identifier information by the battery module 2000 included in the group is recognized for all groups using the above various methods.

On the other hand, the determination unit 2100 of the battery module 2000 other than the starter battery module 2000-1 determines duplication of the first identifier in response to (1) the number of pieces of received identifier information or (2) an elapse of a predetermined time period. In the case of (1), more specifically, the determination unit 2100 determines duplication of the first identifier in response to the fact that the number of pieces of identifier information received by the identifier information reception unit 2040 becomes equal to a value acquired by subtracting 1 from the total number of battery modules 2000 included in the information processing system 3000. In the case of (2), more specifically, the determination unit 2100 determines duplication of the first identifier in response to the fact that a predetermined time period elapses from the timing at which the first identifier information is received by the identifier information reception unit 2040, or the fact that a predetermined time period elapses from the timing at which the first notification is detected by the first notification detection unit 2080.

Example Embodiment 2

Figure 12:
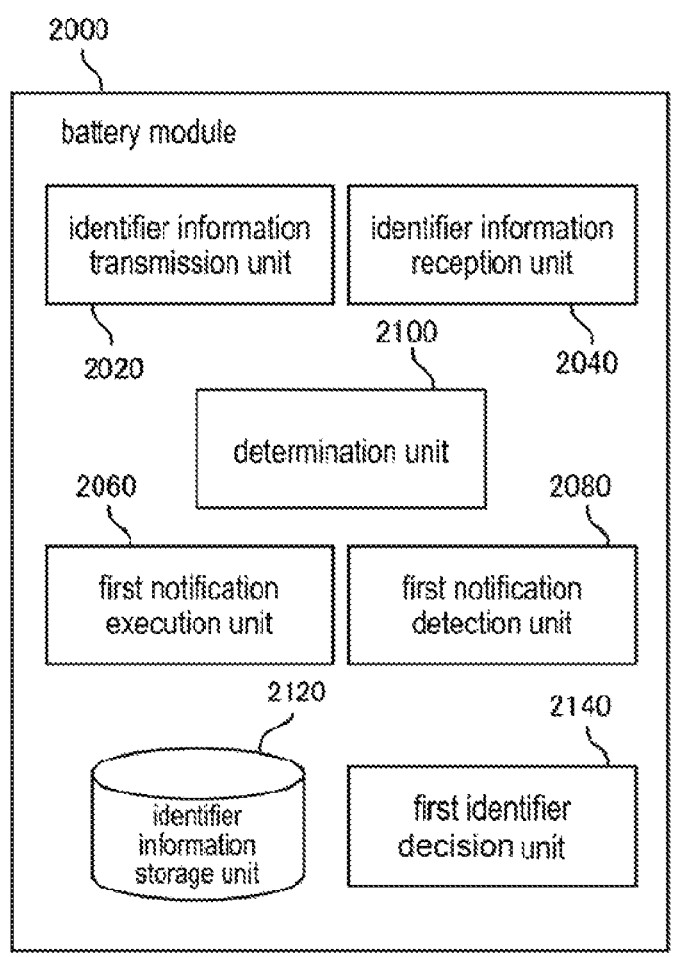
FIG. 12 is a block diagram illustrating a battery module according to Example Embodiment 2.

FIG. 12 is a block diagram illustrating the battery module 2000 according to Example Embodiment 2. The battery module 2000 of Example Embodiment 2 has the same function as the battery module 2000 of Example Embodiment 1 except for the points described below.

The battery module 2000 of Example Embodiment 2 includes a first identifier decision unit 2140. The first identifier decision unit 2140 performs a process of deciding the first identifier to be set in the battery module 2000 in a case where the first identifier of the battery module 2000 is a duplicate of the first identifier of another battery module 2000. By doing so, the first identifier of the battery module 2000 does not become a duplicate of the first identifier of the other battery module 2000.

The information processing system 3000 includes both the battery module 2000 whose first identifier is a duplicate of any other battery modules 2000, and the battery module 2000 whose first identifier is not a duplicate of any other battery modules 2000. In this case, the first identifier decision unit 2140 of the battery module 2000 whose first identifier is not a duplicate of any other battery modules 2000 may decide the first identifier or may not decide the first identifier. In the former case, the first identifier of the battery module 2000 whose first identifier is not a duplicate of any other battery modules 2000 is changed. On the other hand, in the latter case, the first identifier of the battery module 2000 whose first identifier is not a duplicate of any other battery modules 2000 is not changed.

Note that the first identifier decision unit 2140 of the battery module 2000 in which the first identifier is not set decides the first identifier in the same manner as the first identifier decision unit 2140 of the battery module 2000 whose first identifier is a duplicate of another battery module 2000.

Decision of the first identifier by the first identifier decision unit 2140 is performed in accordance with a predetermined rule. The predetermined rule is any rule that enables the first identifier of the battery module 2000 to be decided using an indicator which enables the plurality of battery modules 2000 included in the information processing system 3000 to be distinguished from each other. Hereinafter, several predetermined rules will be illustrated.

<Predetermined Rule 1>

Predetermined Rule 1 is a rule for deciding the first identifier with a timing of transmission of the identifier information of each battery module 2000 as the indicator. As described in Example Embodiment 1, the battery modules 2000 included in the information processing system 3000 transmit the identifier information at different timings. Thus, the battery modules 2000 can be distinguished from each other based on the timing of transmission of the identifier information.

For example, the determination unit 2100 determines the ordinal number at which the battery module 2000 transmits the identifier information among the battery modules 2000 included in the information processing system 3000. Specifically, the determination unit 2100 determines the number of battery modules 2000 from which the identifier information is received before the battery module 2000 transmits the identifier information. For example, the identifier information reception unit 2040 of the battery module 2000 receives two pieces of identifier information before a time point at which the battery module 2000 transmits the identifier information. In this case, the battery module 2000 is the third battery module 2000 that transmits the identifier information.

Note that in order to determine an order (the ordinal number at which the identifier information is transmitted) at the time point at which the identifier information is transmitted, a time point (for example, a reception time) at which the identifier information is received is stored in association with the identifier information in the identifier information storage unit 2120. In addition, the time point at which the battery module 2000 transmits the identifier information is stored in any storage device.

In addition, for example, in a case where the battery module 2000 transmits the identifier information, the battery module 2000 may determine the order of the time point at which the battery module 2000 transmits the identifier information, and may store the order in the storage device. Specifically, as the order of the time point at which the identifier information is transmitted, the battery module 2000 stores the number that is acquired by adding 1 to the number of pieces of identifier information received before the identifier information is transmitted.

In Predetermined Rule 1, the identifier of the battery module 2000 is associated with the order of the time point at which the identifier information is transmitted. The first identifier that can be associated with the order at which the identifier information is transmitted is different between (1) a case where the first identifier of the battery module 2000 whose first identifier is not a duplicate of any other battery modules 2000 is not changed, and (2) a case where the first identifier of the battery module 2000 whose first identifier is not a duplicate of any other battery modules 2000 is changed. Hereinafter, each case will be described. Note that in the case of (1), the first identifier decision unit 2140 of the battery module 2000 whose first identifier is not a duplicate of another battery module 2000 does not decide the first identifier. On the other hand, in the case of (2), the first identifier decision unit 2140 of each of all battery modules 2000 decides the first identifier.

<<Case of (1)>>

In the case of (1), the first identifier (the first identifier that is set in only one battery module 2000) that keeps being used without change needs to be excluded from candidates of the first identifier newly set by the other battery module 2000. To do so, for example, the first identifier is decided as follows.

First, the first identifier decision unit 2140 determines the first identifier that is used by only one battery module 2000. Specifically, the first identifier decision unit 2140 determines the first identifier that is not a duplicate of another first identifier, from the first identifier of the battery module 2000 and the first identifier indicated in each identifier information stored in the identifier information storage unit 2120.

Furthermore, the first identifier decision unit 2140 generates a set (hereinafter, a candidate set) excluding the first identifier that is not a duplicate of the other first identifier, from a set of all first identifiers that can be set in the battery module 2000. For example, the first identifier is represented by a 1-byte value, and it is determined that 0x00 and 0xFF are not used as the first identifier. In this case, a set S of the first identifiers that can be set in the battery module 2000 is S={0x01, 0x02, . . . , 0xFE}.

In addition, the first identifier 0x02 is set in only the battery module 2000-2, and the first identifier 0x04 is set in only the battery module 2000-3. In this case, a candidate set C is set C={0x01, 0x03, 0x05, . . . , 0xFE} acquired by excluding 0x02 and 0x04 from the set S.

Figure 13:
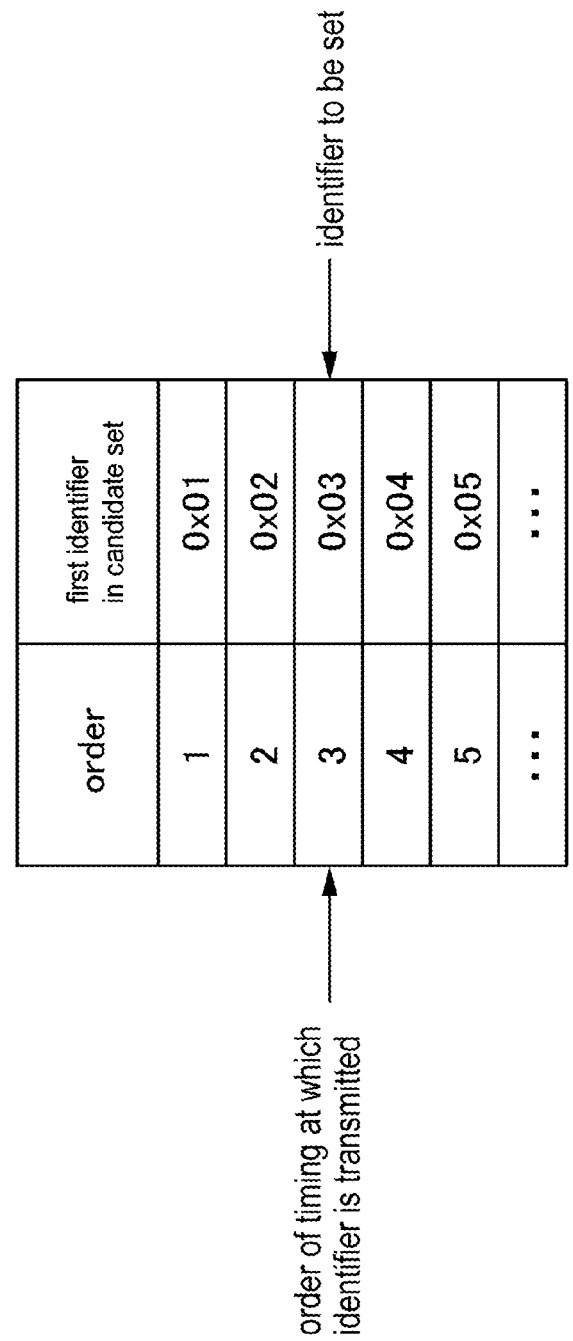
FIG. 13 is a first diagram illustrating association between a time point at which the identifier information is transmitted and a candidate set C.

The first identifier decision unit 2140 decides the first identifier of the battery module 2000 from the first identifiers included in the candidate set based on the order of the time point at which the battery module 2000 transmits the identifier information. For example, the first identifier decision unit 2140 performs calculation such that the "order at which the battery module 2000 transmits the identifier information is 3". In this case, the first identifier decision unit 2140 decides the third first identifier (in the candidate set C, 0x05) in the candidate set as the first identifier of the battery module 2000. FIG. 13 is a first diagram illustrating association between the time point at which the identifier information is transmitted and the candidate set C.

Note that in the case of (2), in a case where the first identifier decided by the first identifier decision unit 2140 is the same as the first identifier that has been already set in the battery module 2000, a process of changing the first identifier of that battery module 2000 does not need to be performed.

<<Case of (2)>>

The case of (2) is a case where the first identifier of the battery module 2000 whose first identifier is not a duplicate of any other battery modules 2000 is changed. In this case, as the candidate set, the first identifier decision unit 2140 sets a set of identifiers that can be set in the battery module 2000. For example, the set S in the above example is the candidate set.

The first identifier decision unit 2140 decides the first identifier of the battery module 2000 from the first identifiers included in the candidate set based on the order of the time point at which the battery module 2000 transmits the identifier information. For example, the battery module 2000 transmits the identifier information after receiving two pieces of identifier information from other battery modules

Figure 14:
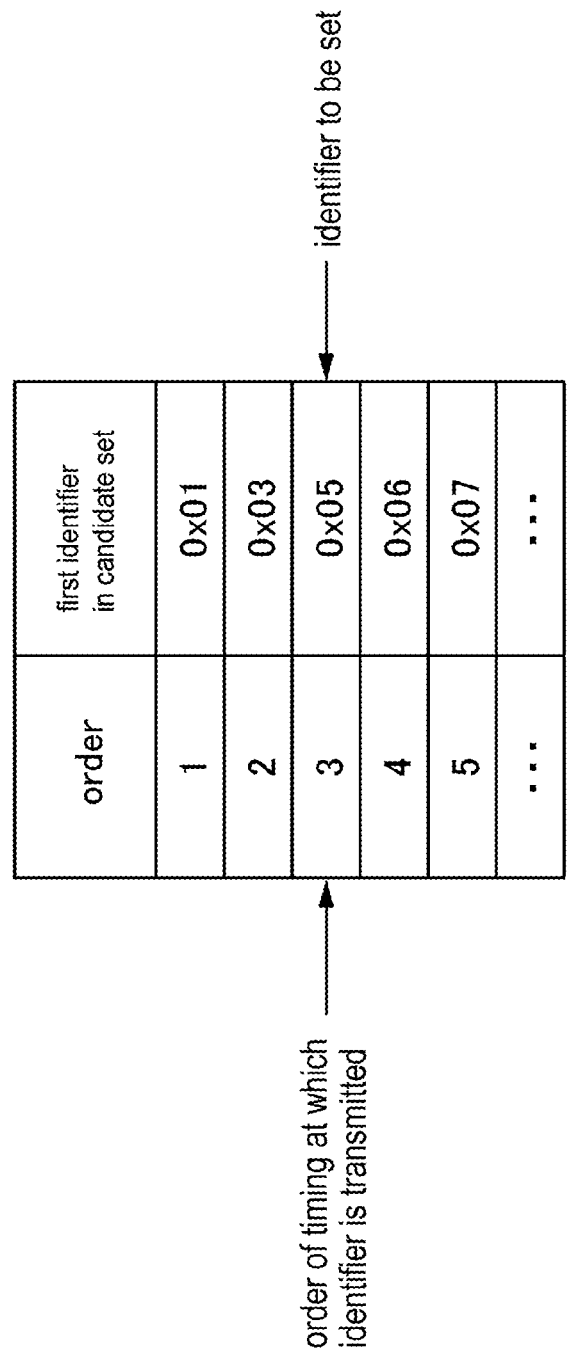
FIG. 14 is a second diagram illustrating the association between the time point at which the identifier information is transmitted and the candidate set C.

2000. In this case, the first identifier decision unit 2140 decides the third first identifier (in the set S, 0x03) in the candidate set S as the first identifier of the battery module 2000. FIG. 14 is a second diagram illustrating the association between the time point at which the identifier information is transmitted and the candidate set C.

<Predetermined Rule 2>

Predetermined Rule 2 is a rule for deciding the first identifier with the manufacturing number of each battery module 2000 as the indicator. The manufacturing number of the battery module 2000 is an identifier that is uniquely assigned to the battery module 2000 when the battery module 2000 is manufactured. Thus, each battery module 2000 included in the information processing system 3000 can be distinguished by the manufacturing number.

For example, the first identifier decision unit 2140 determines the order of the battery module 2000 in a case where the battery modules 2000 included in the information processing system 3000 are arranged in an ascending order of the manufacturing number. The first identifier decision unit 2140 decides the first identifier of the battery module 2000 based on the order of the manufacturing number of the battery module 2000. Note that a method of deciding the first identifier of the battery module 2000 based on the order of the manufacturing number of the battery module 2000 in Predetermined Rule 2 is the same as the method of deciding the first identifier of the battery module 2000 based on the order of the time point at which the battery module 2000 transmits the identifier information in Predetermined Rule 1.

Figure 15A:
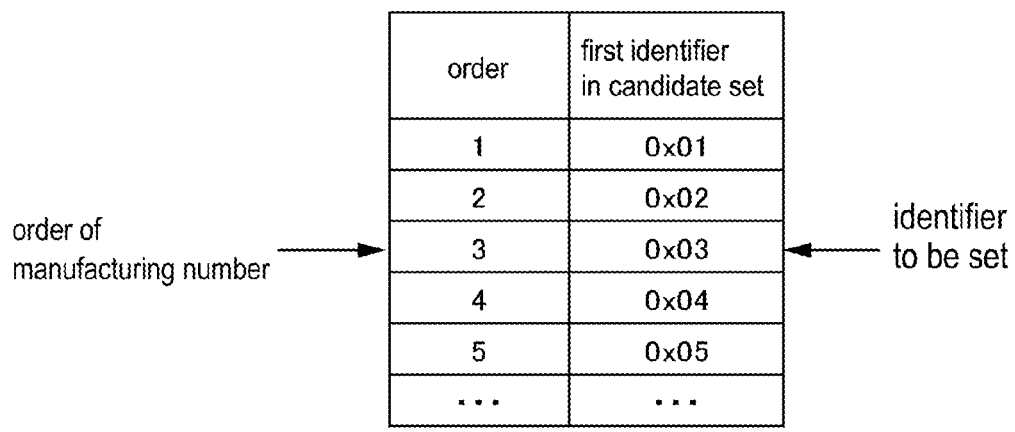
FIGS. 15A and 15B are diagrams illustrating association between a manufacturing number of the battery module and a candidate set.
Figure 15B:
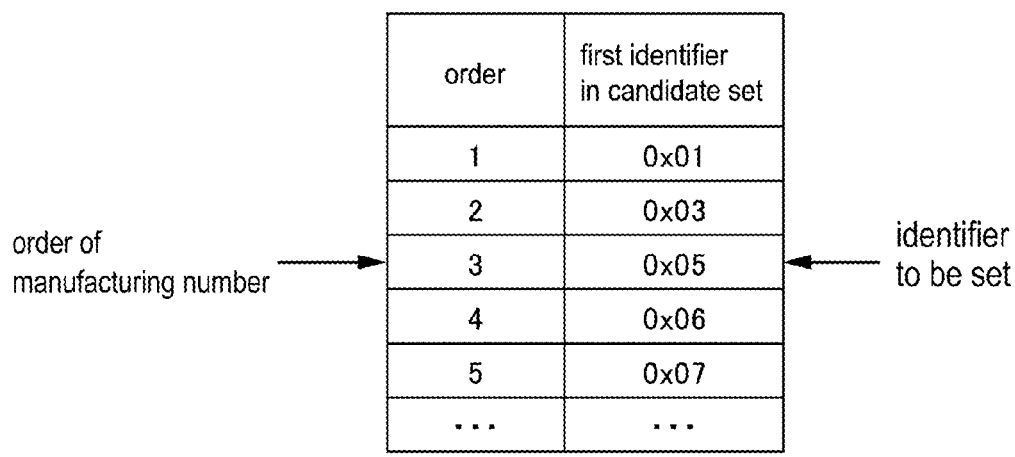

FIG. 15 are diagrams illustrating association between the manufacturing number of the battery module 2000 and the candidate set. In FIG. 15A, the first identifier of the battery module 2000 whose first identifier is not a duplicate of any other battery modules 2000 is not changed. Thus, 0x02 and 0x04 are excluded from the candidate set in the same manner as FIG. 13. On the other hand, in FIG. 15B, the first identifier of the battery module 2000 whose first identifier is not a duplicate of any other battery modules 2000 is changed.

<Hardware Configuration Example>

The battery module 2000 of Example Embodiment 2 is implemented using the controller 1000 in the same manner as Example Embodiment 1 (refer to FIG. 3). In the present example embodiment, each program module stored in the storage 1080 includes a program that realizes each function of the battery module 2000 of the present example embodiment.

<Advantageous Effect>

In a case where the manager or the like manually sets the identifier of the battery module 2000, a problem occurs in that duplication of the identifier is caused by a setting mistake, or the workload of the manager or the like is increased. Furthermore, in a case where a switch circuit for manually setting the identifier is disposed in the battery module 2000, a problem occurs in that the circuit scale of the battery module 2000 is increased.

To the contrary, according to the information processing system 3000 of the present example embodiment, the first identifier is automatically changed such that duplication of the first identifier is resolved in a case where there is duplication of the first identifier between the battery modules 2000. Thus, various problems that occurs in the case of the manual setting can be avoided.

Furthermore, in the information processing system 3000 of the present example embodiment, the first identifier decision unit 2140 of each battery module 2000 individually decides the first identifier. Thus, unlike a method in which certain one battery module 2000 decides the first identifier of another battery module 2000, concentration of a process load on one battery module 2000 can be prevented.

Example Embodiment 3

Figure 16:
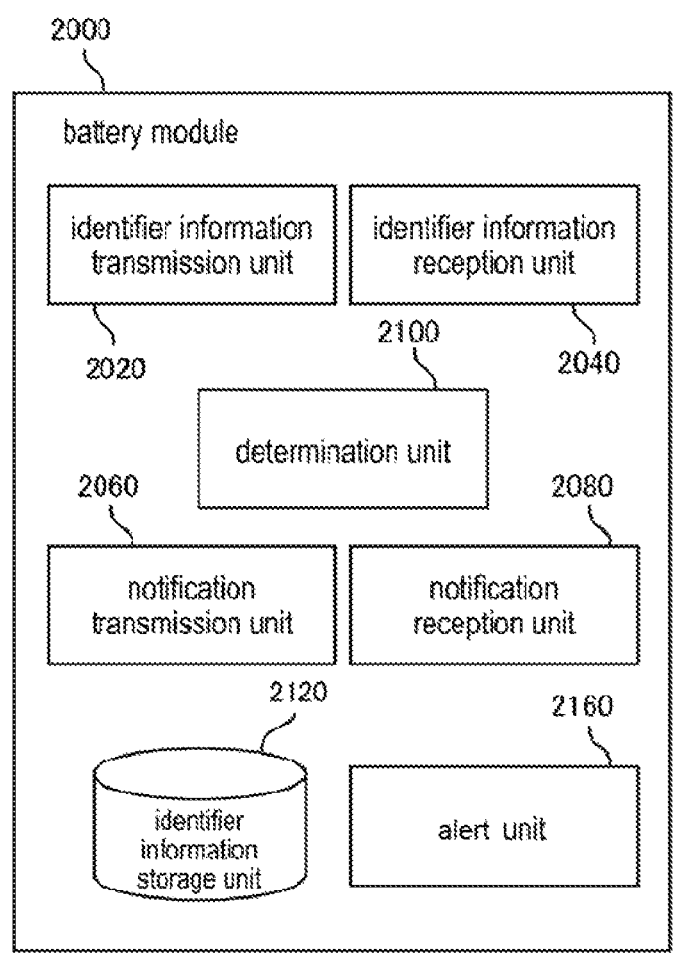
FIG. 16 is a block diagram illustrating a battery module according to Example Embodiment 3.

FIG. 16 is a block diagram illustrating the battery module 2000 according to Example Embodiment 3. The battery module 2000 of Example Embodiment 3 has the same function as the battery module 2000 of Example Embodiment 1 except for the points described below.

The battery module 2000 of Example Embodiment 3 includes an alert unit 2160. The alert unit 2160 outputs an alert in a case where it is determined that the first identifier of the battery module 2000 is a duplicate of the first identifier of another battery module 2000. The alert is an alert for notifying a user (the manager or the like of the battery module 2000) that the first identifier of the battery module 2000 is a duplicate of the first identifier of another battery module 2000.

There are various methods for the alert unit 2160 to output the alert. For example, the alert unit 2160 outputs the alert by turning on a light emitting diode (LED) lamp. In addition, for example, the alert unit 2160 may output the alert by causing a buzzer or a speaker to output sound.

<Hardware Configuration Example>

The battery module 2000 of Example Embodiment 3 is implemented using the controller 1000 in the same manner as Example Embodiment 1 (refer to FIG. 3). Furthermore, the battery module 2000 of Example Embodiment 3 is connected to hardware (LED lamp or the like) for implementing the output of the alert by the alert unit 2160 through the input-output interface 1100. In addition, in the present example embodiment, each program module stored in the storage 1080 includes a program that realizes each function of the battery module 2000 of the present example embodiment.

<Advantageous Effect>

According to the information processing system 3000 of the present example embodiment, the alert is output in a case where the first identifier of a certain battery module 2000 is a duplicate of the first identifier of another battery module 2000. Thus, the manager or the like of the battery module 2000 can recognize that the first identifier of the battery module 2000 is a duplicate of another first identifier. Consequently, duplication of the first identifier between the battery modules 2000 can be resolved by taking a measure such that the manager or the like of the battery module 2000 manually changes the first identifier of the battery module 2000. Note that the method of outputting the alert in a case where the first identifier is duplicate between the battery modules 2000 as in the present example embodiment is particularly useful in a case where the battery module 2000 is operated under an operation policy in which automatically changing the first identifier of the battery module 2000 is not desired.

Example Embodiment 4

Figure 17:
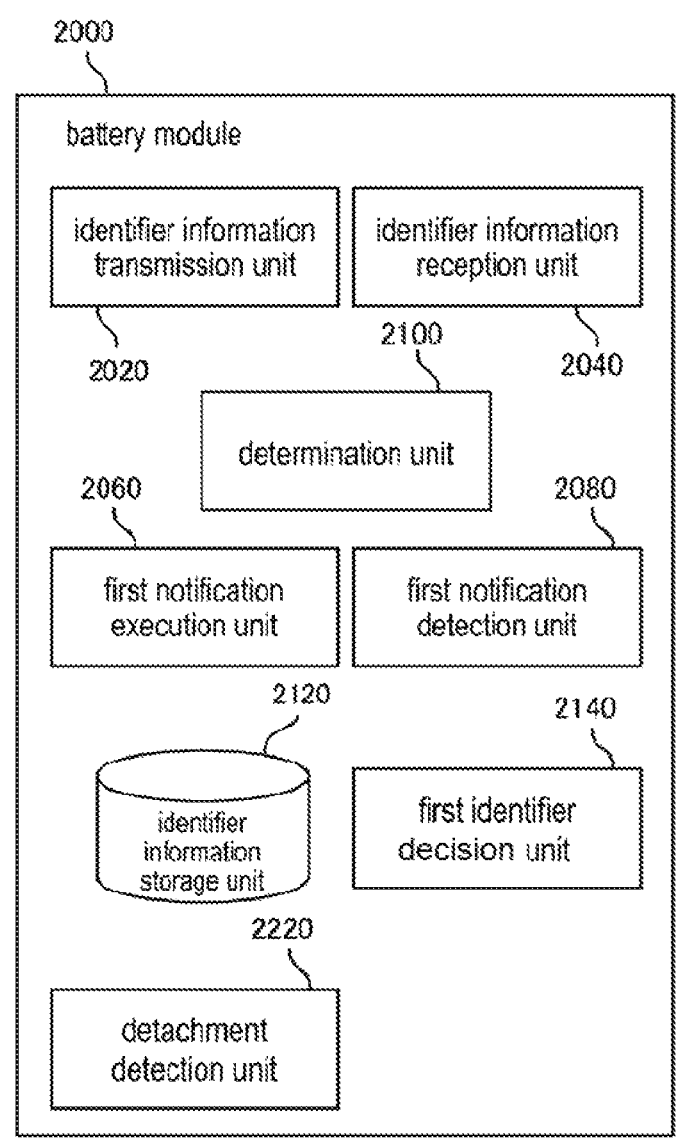
FIG. 17 is a block diagram illustrating a battery module according to Example Embodiment 4.

FIG. 17 is a block diagram illustrating the battery module 2000 according to Example Embodiment 4. The battery module 2000 of Example Embodiment 4 has the same function as the battery module 2000 of Example Embodiment 2 except for the points described below.

The battery module 2000 of Example Embodiment 4 has a function of detecting detachment of any battery module 2000 from the information processing system 3000. To do so, the battery module 2000 of Example Embodiment 4 includes a detachment detection unit 2220.

The detachment detection unit 2220 operates in a state where the first identifier that is not a duplicate of other battery modules 2000 is set in the battery module 2000. Specifically, the detachment detection unit 2220 operates after the determination unit 2100 determines that the first identifier of the battery module 2000 is not a duplicate of other battery modules 2000, or after the first identifier decided by the first identifier decision unit 2140 is set in the battery module 2000. Hereinafter, a specific operation of the detachment detection unit 2220 will be illustrated.

First, in the battery module 2000 that has the smallest first identifier among the first identifiers of the battery modules 2000 included in the information processing system 3000, the detachment detection unit 2220 causes the identifier information transmission unit 2020 to periodically transmit the identifier information.

For example, the battery module 2000 sets a timer process for operating the detachment detection unit 2220 after a predetermined time period when the determination unit 2100 determines that the first identifier of that battery module 2000 is not a duplicate of other battery modules 2000, or when the first identifier decided by the first identifier decision unit 2140 is set in that battery module 2000. In addition, after the detachment detection unit 2220 is operated by the timer process, the battery module 2000 sets the same timer process again. The predetermined time period may be set in advance in the battery module 2000 or may be stored in a storage device that can be accessed from the battery module 2000.

The detachment detection unit 2220 of each of the other battery modules 2000 causes the identifier information transmission unit 2020 to transmit the identifier information in response to the fact that the identifier information that satisfies a predetermined condition is received. The predetermined condition is a condition such that the "first identifier that is smaller than the first identifier of the own battery module 2000 and is most similar to the first identifier of the own battery module 2000 is indicated". In other words, in a case where certain identifier information is transmitted, the detachment detection unit 2220 of the battery module 2000 whose first identifier is the largest after the first identifier indicated by the identifier information operates. Thus, in a case where any battery module 2000 is not detached from the information processing system 3000, the identifier information is transmitted in order by all battery modules 2000.

On the other hand, in a case where a certain battery module 2000 is detached from the information processing system 3000, the detachment detection unit 2220 in the battery module 2000 whose first identifier is the largest after the certain battery module 2000 does not operate because the identifier information satisfying the predetermined condition is not received. Therefore, the detachment detection unit 2220 is configured to "transmit the identifier information at a predetermined timing in a case where the identifier information satisfying the predetermined condition is not received". By doing so, the identifier information is transmitted from all battery modules 2000 other than the battery module 2000 detached from the information processing system 3000. For example, the predetermined timing is a timing that is a predetermined time period after from a time point of reception of the identifier information that is most recently received. The predetermined time period may be set in advance in the battery module 2000 or may be stored in a storage device that can be accessed from the battery module 2000.

The detachment detection unit 2220 compares the first identifier indicated in the identification information received from each battery module 2000 with a list of first identifiers of the battery modules 2000 included in the information processing system 3000 (a method of creating the list will be described below). In a case where the first identifier that is not indicated in any received identification information is present among the first identifiers included in the list, the detachment detection unit 2220 determines that the battery module 2000 having the first identifier is detached from the information processing system 3000. By doing so, each battery module 2000 detects detachment of the battery module 2000 from the information processing system 3000 and furthermore, finds the first identifier of the detached battery module 2000.

Figure 18A:
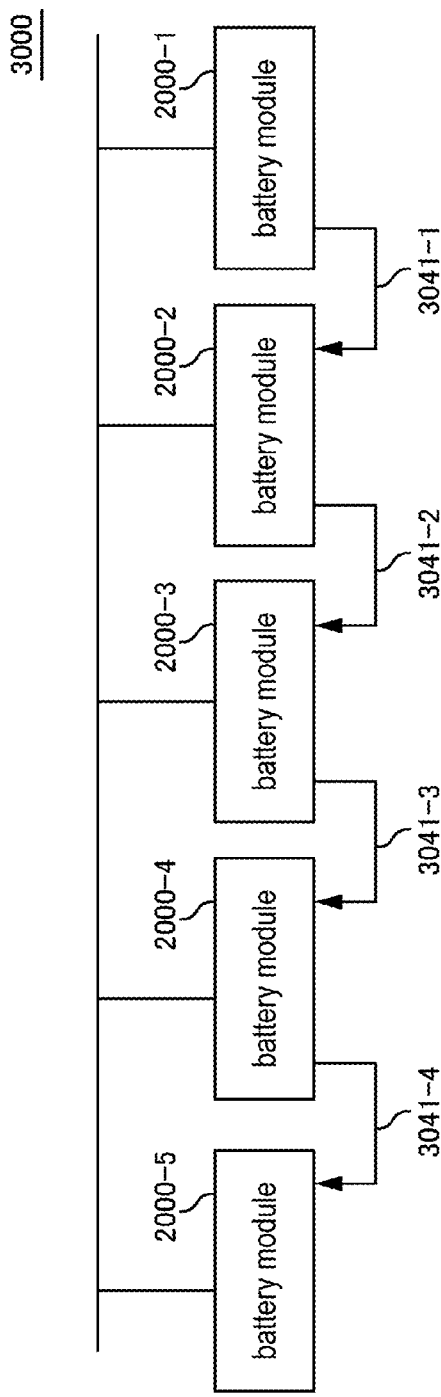
FIGS. 18A and 18B are diagrams illustrating a configuration example of an information processing system in a specific example.

Hereinafter, the operation of the battery module 2000 of the present example embodiment will be described using a specific example. FIG. 18 are diagrams illustrating a configuration example of the information processing system 3000 in the specific example. In FIG. 18A, the information processing system 3000 includes the battery module 2000-1 to the battery module 2000-5. The first identifiers 0x01, 0x02, 0x03, 0x04, and 0x05 are set in this order in the battery module 2000-1 to the battery module 2000-5. In addition, each battery module 2000 stores a list of first identifiers indicating 0x01 to 0x05.

In a case where all of the battery module 2000-1 to the battery module 2000-5 are included in the information processing system 3000 (refer to FIG. 18A), the identifier information is transmitted in order from the battery module 2000-1. Thus, each first identifier indicated in the list of first identifiers is indicated in any identifier information. Thus, the detachment detection unit 2220 of each battery module 2000 determines that there is no battery module 2000 detached from the information processing system 3000.

Figure 18B:
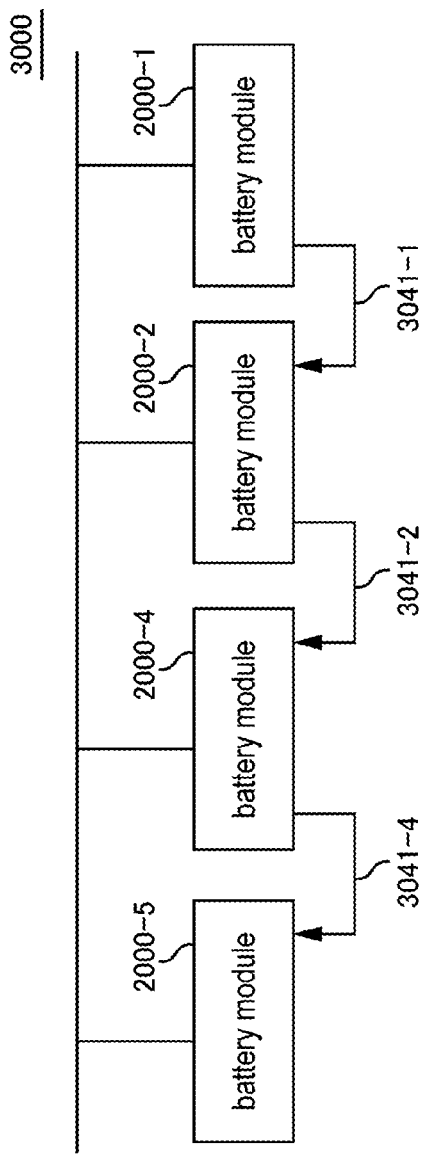

On the other hand, the battery module 2000-3 is detached from the information processing system 3000 in FIG. 18. This situation is illustrated in FIG. 18B. In this case, first, the identifier information is transmitted in order of the battery module 2000-1 and the battery module 2000-2. However, the identifier information is not transmitted from the battery module 2000-3.

The identifier information that is to be transmitted by the battery module 2000-3 is the identifier information that indicates 0x03 as the first identifier. This identifier information is the identifier information that satisfies the predetermined condition for the battery module 2000-4. Thus, the detachment detection unit 2220 of the battery module 2000-4 transmits the identifier information at a predetermined timing. Furthermore, the battery module 2000-5 transmits the identifier information based on the fact that the identifier information transmitted by the battery module 2000-4 is received.

After each identifier information transmitted by the battery module other than the battery module 2000-3 is received, the detachment detection unit 2220 of each battery module 2000 compares the first identifier indicated in the received identification information with the list of first identifiers of the battery modules 2000 included in the information processing system 3000. Consequently, it is found that the identifier information indicating the first identifier 0x03 is not received. Accordingly, the detachment detection unit 2220 of each battery module 2000 detects detachment of the battery module 2000-3 from the information processing system 3000.

<List of First Identifiers>

In the present example embodiment, it is assumed that each battery module 2000 has the list indicating the first identifier set in each battery module 2000 included in the information processing system 3000. This list is created by the first identifier decision unit 2140 described in Example Embodiment 2. Note that the list does not need to indicate association between the first identifier and the battery module 2000, provided that the list indicates a list of first identifiers.

As described in Example Embodiment 1, each battery module 2000 receives the identifier information from each of the other battery modules 2000 in a series of processes for deciding the first identifier. The first identifier decision unit 2140 can calculate the number of battery modules 2000 included in the information processing system 3000 as the number acquired by adding 1 to the number of pieces of received identifier information (the total number of battery modules 2000 except the own battery module 2000). That is, the first identifier decision unit 2140 can recognize the total number of battery modules 2000 included in the information processing system 3000.

Therefore, as the list, the first identifier decision unit 2140 creates a list indicating the first identifiers corresponding in number to the total number from the head of the first identifiers included in the candidate set that is sorted in an ascending order of the first identifier.

<Advantageous Effect>

According to the information processing system 3000 of the present example embodiment, detachment of the battery module 2000 from the information processing system 3000 can be automatically recognized.

While example embodiments of the present invention have been described thus far with reference to the drawings, the example embodiments are illustrations of the present invention, and combinations of the example embodiments or various configurations other than those described above can be employed.

This application claims the benefit of priority from Japanese Patent Application No. 2016-129617 filed on Jun. 30, 2016, the entire disclosure of which is incorporated herein.

The invention claimed is:

1. An information processing system comprising a plurality of battery modules,
    wherein each battery module is communicable with all of other battery modules through a first communication network,
    each battery module is communicable with another battery module through a second communication network constituting a linear topology,
    the battery module includes:
        an identifier information transmission unit that transmits identifier information to all of other battery modules through the first communication network, the identifier information indicating a first identifier on the first communication network that is set in the battery module, or indicating a fact that the first identifier is not set in the battery module;
        an identifier information reception unit that receives the identifier information transmitted by the other battery module;
        a first notification execution unit that performs first notification through the second communication network for the other battery module adjacent in a first direction on the second communication network;
        a first notification detection unit that detects the first notification performed by the other battery module adjacent in a second direction on the second communication network; and
        a determination unit that determines whether or not the first identifier of the battery module is a duplicate of the first identifier of each of the other battery modules using the identifier information received from each of other battery modules in response to a fact that the identifier information is transmitted by the identifier information transmission units of all of the plurality of battery modules,
    the identifier information transmission unit of a first battery module transmits the identifier information in response to a predetermined event other than detection of the first notification by the first notification detection unit of the first battery module, and
    the identifier information transmission unit of each battery module other than the first battery module transmits the identifier information in response to a fact that the first notification is detected by the first notification detection unit.

2. The information processing system according to claim 1,
    wherein the battery module includes a first identifier decision unit that, in a case where it is determined that the first identifier of the battery module is a duplicate of the first identifier of an other battery module, decides the first identifier of the battery module to be a value not a duplicate of the other battery module in accordance with a predetermined rule.

3. The information processing system according to claim 2,
    wherein the predetermined rule is a rule for deciding the first identifier to be set in the battery module based on a time point at which the battery module transmits the identifier information or a manufacturing number of the battery module.

4. The information processing system according to claim 2,
    wherein the battery module includes:
        a second notification execution unit that performs second notification through the second communication network for the other battery module adjacent in the second direction on the second communication network; and
        a second notification detection unit that detects the second notification performed by the other battery module adjacent in the first direction on the second communication network,
    a second battery module that is at a terminal position in the first direction in the second communication network performs the determination by the determination unit and the second notification by the second notification execution unit after transmitting the identifier information, and
    the battery module other than the second battery module performs the determination by the determination unit and the second notification by the second notification execution unit in response to a fact that the second notification is detected by the second notification detection unit.

5. The information processing system according to claim 1,
    wherein the battery module includes a changing unit that outputs an alert in a case where it is determined that the first identifier of the battery module is a duplicate of the first identifier of the other battery module.

6. The information processing system according to claim 1,
wherein the first notification detection unit writes the received identifier information into an identifier information storage unit, and
the determination unit uses the identifier information stored in the identifier information storage unit.

7. A battery module included in the information processing system according to claim 1.

8. A control method that is executed by an information processing system including a plurality of battery modules,
wherein each battery module is communicable with all of other battery modules through a first communication network,
each battery module is communicable with another battery module through a second communication network constituting a linear topology,
the control method comprises:
the battery module transmits identifier information to all of other battery modules through the first communication network, the identifier information indicating a first identifier on the first communication network that is set in the battery module, or indicating a fact that the first identifier is not set in the battery module;
the battery module receives the identifier information transmitted by the other battery module;
the battery module performs first notification through the second communication network for the other battery module adjacent in a first direction on the second communication network;
the battery module detects the first notification performed by the other battery module adjacent in a second direction on the second communication network; and
the battery module determines whether or not the first identifier of the battery module is a duplicate of the first identifier of each of other battery modules using the identifier information received from each of the other battery modules in response to a fact that the identifier information is transmitted by all of the plurality of battery modules,
wherein by a first battery module, the identifier information is transmitted in response to a predetermined event other than detection of the first notification by the first battery module, and
by each battery module other than the first battery module, the identifier information is transmitted in response to a fact that the first notification is detected.

9. The control method according to claim 8, further comprising:
in a case where it is determined that the first identifier of the battery module is a duplicate of the first identifier of an other battery module, the battery module decides the first identifier of the battery module to be a value not a duplicate of the other battery module in accordance with a predetermined rule.

10. The control method according to claim 9,
wherein the predetermined rule is a rule for deciding the first identifier to be set in the battery module based on a time point at which the battery module transmits the identifier information or a manufacturing number of the battery module.

11. The control method according to claim 9, further comprising:
the battery module performs second notification through the second communication network by the battery module for the other battery module adjacent in the second direction on the second communication network; and
the battery module detects the second notification performed by the other battery module adjacent in the first direction on the second communication network,
wherein a second battery module that is at a terminal position in the first direction in the second communication network performs the determination and the second notification after transmitting the identifier information, and
the battery module other than the second battery module performs the determination and the second notification in response to a fact that the second notification is detected.

12. The control method according to claim 8, further comprising:
the battery module outputs an alert in a case where it is determined that the first identifier of the battery module is a duplicate of the first identifier of the other battery module.

13. The control method according to claim 8,
wherein the received identifier information is written into an identifier information storage unit, and
the identifier information stored in the identifier information storage unit is used.

14. A non-transitory computer-readable storage medium storing a program that causes a computer to execute each step of the control method according to claim 8.

* * * * *